(12) United States Patent
Laird-McConnell et al.

(10) Patent No.: US 10,587,708 B2
(45) Date of Patent: Mar. 10, 2020

(54) MULTI-MODAL CONVERSATIONAL INTERCOM

(71) Applicant: Microsoft Technology Licensing, LLC, Redmond, WA (US)

(72) Inventors: Thomas Matthew Laird-McConnell, Kirkland, WA (US); Lili Cheng, Bellevue, WA (US); James H. Lewallen, Fall City, WA (US); Justin Cranshaw, Seattle, WA (US); Craig Jensen, Sammamish, WA (US); Steve Ickman, Snoqualme, WA (US); William L. Portnoy, Woodinville, WA (US); Qi Lu, Bellevue, WA (US); Daniel J. Driscoll, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 15/083,019

(22) Filed: Mar. 28, 2016

(65) Prior Publication Data

US 2017/0279906 A1    Sep. 28, 2017

(51) Int. Cl.
*G06F 15/16* (2006.01)
*H04L 29/08* (2006.01)

(52) U.S. Cl.
CPC .............. *H04L 67/22* (2013.01); *H04L 67/10* (2013.01); *H04L 67/14* (2013.01); *H04L 67/306* (2013.01)

(58) Field of Classification Search
USPC ........................................ 709/202, 203, 206
See application file for complete search history.

(56) References Cited

U.S. PATENT DOCUMENTS 6,549,937 B1    4/2003  Auerbach et al.
6,782,403 B1    8/2004  Kino et al.
(Continued)

FOREIGN PATENT DOCUMENTS

EP    2141901 A1    1/2010
WO    9953676 A1    4/1999
(Continued)

OTHER PUBLICATIONS

"e-Messaging for e-Mail & SMS Communications", Retrieved on: Oct. 6, 2015 Available at:http://www.pbinsight.co.in/products/customer-communication-mgmt/document-comp/e-mail-sms-comms/e-messaging3/, 2 pages.
(Continued)

*Primary Examiner* — Umar Cheema
*Assistant Examiner* — Anthony T Rotolo
(74) *Attorney, Agent, or Firm* — Shook, Hardy & Bacon, L.L.P.

(57) ABSTRACT

The techniques discussed herein allow an agent that provides dialog-based services to converse with a user via any mode. A central service programmed to be able to communicate via any mode collects information from agents necessary to act on the agents' behalf. In order to ensure that an agent has a maximal presence across modes, the central service provides auxiliary services such as language translation, fidelity upgrading and/or downgrading, modal constraint conformation, etc. Moreover, the central service provides session tracking via user profiles stored at the intercom so that if a user changes a mode by which the user is conversing with an agent, the central service can keep the context of the conversation across the new mode. Furthermore, agents can communicate with other agents via the central service, allowing other agents to provide services to agents or to add their services to an ongoing dialog with a user.

18 Claims, 11 Drawing Sheets

(56) References Cited

U.S. PATENT DOCUMENTS

| | | | |
|---|---|---|---|
| 6,879,994 | B1 | 4/2005 | Matsliach et al. |
| 7,290,039 | B1 | 10/2007 | Lisitsa et al. |
| 7,315,613 | B2 | 1/2008 | Kleindienst et al. |
| 7,533,149 | B2 | 5/2009 | Starbuck et al. |
| 7,895,246 | B2 | 2/2011 | Bauman et al. |
| 7,903,637 | B2 | 3/2011 | Moore et al. |
| 7,921,214 | B2 | 4/2011 | Da Palma et al. |
| 8,037,449 | B2 | 10/2011 | Iborra et al. |
| 8,046,737 | B2 | 10/2011 | Wittenberg et al. |
| 8,121,653 | B2 | 2/2012 | Marti et al. |
| 8,160,054 | B2 | 4/2012 | Weiner |
| 8,171,080 | B2 | 5/2012 | Gupta |
| 8,199,763 | B2 | 6/2012 | Sheridan et al. |
| 8,363,799 | B2 | 1/2013 | Gruchala et al. |
| 8,407,298 | B2 | 3/2013 | Kamat et al. |
| 8,503,650 | B2 | 8/2013 | Reding et al. |
| 8,589,161 | B2 | 11/2013 | Kennewick et al. |
| 8,645,484 | B2 | 2/2014 | Ferrell et al. |
| 8,649,808 | B2 | 2/2014 | Neely et al. |
| 8,700,072 | B2 | 4/2014 | Pascal et al. |
| 8,706,912 | B2 | 4/2014 | Baxter, Jr. |
| 8,793,617 | B2 | 7/2014 | Xu et al. |
| 8,861,537 | B1 | 10/2014 | Braithwaite et al. |
| 8,875,019 | B2 | 10/2014 | Tan et al. |
| 8,881,020 | B2 | 11/2014 | Affronti et al. |
| 8,917,828 | B2 | 12/2014 | Bouzid et al. |
| 9,043,474 | B2 | 5/2015 | Schleifer et al. |
| 9,137,228 | B1 | 9/2015 | Newstadt |
| 9,191,358 | B2 | 11/2015 | Long et al. |
| 9,356,988 | B2 | 5/2016 | Shuman et al. |
| 9,392,053 | B2 | 7/2016 | Fausak et al. |
| 9,413,882 | B2 | 8/2016 | Gisby et al. |
| 9,451,425 | B2 | 9/2016 | Pollack et al. |
| 9,467,545 | B1 | 10/2016 | Agranov |
| 9,473,912 | B2 | 10/2016 | Circosta et al. |
| 9,532,197 | B1 | 12/2016 | Lew et al. |
| 9,607,269 | B2 | 3/2017 | Daly et al. |
| 9,794,762 | B2 | 10/2017 | Bakos et al. |
| 9,800,537 | B2 | 10/2017 | Talwar et al. |
| 9,843,543 | B2 | 12/2017 | Ghafourifar et al. |
| 2003/0093480 | A1 | 5/2003 | Lagarde et al. |
| 2005/0135595 | A1* | 6/2005 | Bushey ............... H04M 3/5191 379/265.01 |
| 2005/0216550 | A1 | 9/2005 | Paseman et al. |
| 2007/0150603 | A1 | 6/2007 | Crull et al. |
| 2008/0147406 | A1 | 6/2008 | Da palma et al. |
| 2009/0016504 | A1 | 1/2009 | Mantell et al. |
| 2009/0319918 | A1 | 12/2009 | Affronti et al. |
| 2009/0327441 | A1* | 12/2009 | Lee ...................... H04L 51/043 709/206 |
| 2009/0328062 | A1 | 12/2009 | Ganesan et al. |
| 2010/0036923 | A1 | 2/2010 | Byrne et al. |
| 2010/0036926 | A1 | 2/2010 | Ahart et al. |
| 2010/0082750 | A1 | 4/2010 | Kunz et al. |
| 2010/0199340 | A1 | 8/2010 | Jonas et al. |
| 2011/0029923 | A1 | 2/2011 | Xu et al. |
| 2011/0060801 | A1 | 3/2011 | Virk et al. |
| 2011/0196922 | A1 | 8/2011 | Marcucci et al. |
| 2012/0016678 | A1 | 1/2012 | Gruber et al. |
| 2013/0073636 | A1 | 3/2013 | Zhu et al. |
| 2013/0097333 | A1 | 4/2013 | Bathurst et al. |
| 2013/0179521 | A1 | 7/2013 | Hu |
| 2013/0246050 | A1 | 9/2013 | Yu et al. |
| 2013/0304829 | A1 | 11/2013 | Olsen et al. |
| 2014/0040404 | A1 | 2/2014 | Pujare et al. |
| 2014/0181137 | A1 | 6/2014 | Stein |
| 2014/0181864 | A1 | 6/2014 | Marshall et al. |
| 2014/0314225 | A1* | 10/2014 | Riahi .................... G06Q 30/02 379/265.09 |
| 2015/0066479 | A1 | 3/2015 | Pasupalak et al. |
| 2015/0135214 | A1 | 5/2015 | Reisman |
| 2016/0050235 | A1 | 2/2016 | Ghafourifar et al. |
| 2016/0062739 | A1 | 3/2016 | Kaulgud et al. |
| 2016/0119477 | A1* | 4/2016 | Sharpe ............... G06Q 30/0261 379/265.09 |
| 2016/0191705 | A1* | 6/2016 | Kumar .............. H04M 3/42153 379/265.02 |
| 2016/0219149 | A1* | 7/2016 | Krishnan ............. H04M 3/5175 |
| 2017/0279759 | A1 | 9/2017 | Liden et al. |
| 2017/0286069 | A1 | 10/2017 | Karunakaran |

FOREIGN PATENT DOCUMENTS

| | | |
|---|---|---|
| WO | 2013155619 A1 | 10/2013 |
| WO | 2015116708 A1 | 8/2015 |

OTHER PUBLICATIONS

"LUIS Tutorial", Retrieved From: https://web.archive.org/web/20160319100811/https://www.luis.ai/Help, Feb. 20, 2016, 46 Pages.

"Message Systems Resources", Retrieved From: https://www.messagesystems.com/resources/glossary/cross-channel-communication, Feb. 13, 2014, 2 Pages.

"Momentum All-in-One Platform for Email, Mobile, Data & Analytics", Retrieved From: https://www.messagesystems.com/products/momentum-platform, Retrieved on: Feb. 15, 2016, 6 Pages.

"Nimbuzz: Free Calls & Messaging 3.2.0", Retrieved From: https://nimbuzz-free-calls-and-messaging.soft112.com/, Oct. 1, 2014, 8 Pages.

"Zup: Inter-Social Network Communication Tool", Retrieved From: http://www.orangeinks.com/tips-n-tricks/zup-inter-social-network-communication-tool/, Jun. 14, 2008, 4 Pages.

"Non-Final Office Action Issued in U.S. Appl. No. 15/083,118", dated Jan. 10, 2018, 9 Pages.

"Non-Final Office Action Issued in U.S. Appl. No. 15/083,984", dated May 31, 2018, 23 Pages.

Halder, Soumen, "Use Your Webcam With Multiple Programs Simultaneously", Retrieved From: https://www.maketecheasier.com/use-webcam-with-multiple-programs/, Jan. 25, 2011, 3 Pages.

Han, et al., "NLify: Lightweight spoken natural language interfaces via exhaustive paraphrasing", In Proceedings of UbiComp 2013, Jan. 1, 2013, 10 Pages.

"International Search Report and Written Opinion Issued in PCT Application No. PCT/US17/023922", dated Jun. 23, 2017, 10 Pages.

"International Search Report and Written opinion issued in PCT Application No. PCT/US2017/023496", dated Jun. 7, 2017, 13 Pages.

"International Search Report and Written opinion issued in PCT Application No. PCT/US2017/023500", dated May 30, 2017, 14 pages.

Sateli, et al., "Smarter mobile apps through integrated natural language processing services", In Proceedings of International Conference on Mobile Web and Information Systems, MobiWIS 2013, Aug. 26, 2013, 15 Pages.

Williams, et al., "Fast and easy language understanding for dialog systems with Microsoft Language Understanding Intelligent Service (LUIS)", In Proceedings of 2015 SIGDIAL Conference, Prague, Sep. 1, 2015, 3 Pages.

Williams, Alex, "Zapier Opens Its Developer Platform, Gives The Everyday Joe A Way To Connect APIs", Retrieved From: https://techcrunch.com/2014/01/17/zapier-opens-its-developer-platform-gives-the-everyday-joe-a-way-to-connect-apis/, Jan. 17, 2014, 7 Pages.

"Final Office Action Issued in U.S. Appl. No. 15/083,984", dated Dec. 13, 2018, 26 Pages.

"Non Final Office Action Issued in U.S. Appl. No. 15/083,984", dated Jun. 28, 2019, 26 Pages.

"Office Action Issued in European Patent Application No. 17714382.3", dated Sep. 27, 2019, 4 Pages.

* cited by examiner

‎ ⟵ 600

| | |
|---|---|
| Register Agent × + | |
| ← → ↻ agents.com/register | |

[General] [Channels] [Test]

| | |
|---|---|
| Name | Directory Agent |
| Description | Query corporation Active Directory for information about people |
| Endpoint | http://directoryagent.azurewebsite.net/api//Messages |
| Publisher | botprovider15 |
| Publisher Email | botsarecool@live.com |
| Website | |
| Icon URL | http://coolbotpics.com/bot12.png?bgset=any&size=100x100 |
| Owners | botsarecool@live.com, adadmin@live.com |
| Language | en |
| Hashtags | #enterprise |

Services ⟵ 602

☒ Translate messages ☐ Expression API ☐ Active Observation

MULTI-MODAL CONVERSATIONAL INTERCOM

BACKGROUND

Chatbots are computer programs that operate to communicate conversationally in a manner designed to imitate natural human conversation. Originally a novelty, chatbots now commonly serve as customer service to web site visitors. They can provide information responsive to user queries and can accomplish tasks on behalf of the user in some cases, such as, completing or cancelling orders. In order to provide chatbot functionality in a communication channel, developers must code chatbot functionality into each communication channel for which the chatbot functionality it desired. A particular chatbot's functionality is limited to the communication channel for which it is designed.

SUMMARY

This summary is provided to introduce simplified concepts relating to multi-modal agent intercommunication. This summary is not intended to identify essential features of the claimed subject matter, nor is it intended for use in determining the scope of the claimed subject matter.

Techniques for expanding the modes by which an agent can communicate or act are described herein. A central service, referred to herein as an intercom, allows an agent to provide dialog-based services associated with the agent via any mode by collecting information from the agent necessary to act on the agent's behalf and by being configured to be able to communicate via any mode. In order to ensure that an agent has a maximal presence across modes, the intercom provides auxiliary services such as language translation, fidelity upgrading and/or downgrading, modal constraint conformation, etc. The intercom is dynamic so that the intercom can be programmed to communicate via new modes as they are developed. Moreover, the intercom provides session tracking via user profiles stored at the intercom so that if user changes a mode by which the user is communicating with the agent, the intercom keeps the context of the conversation across the new mode. Furthermore, agents can communicate with other agents via the intercom, allowing other agents to provide services to agents or to add their services to an ongoing dialog with a user.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is an example user interface for registering an agent to allow the intercom to act on the agent's behalf.

FIG. 7 is an example user interface for managing channels linked to an agent.

DETAILED DESCRIPTION

Overview

Figure 1:
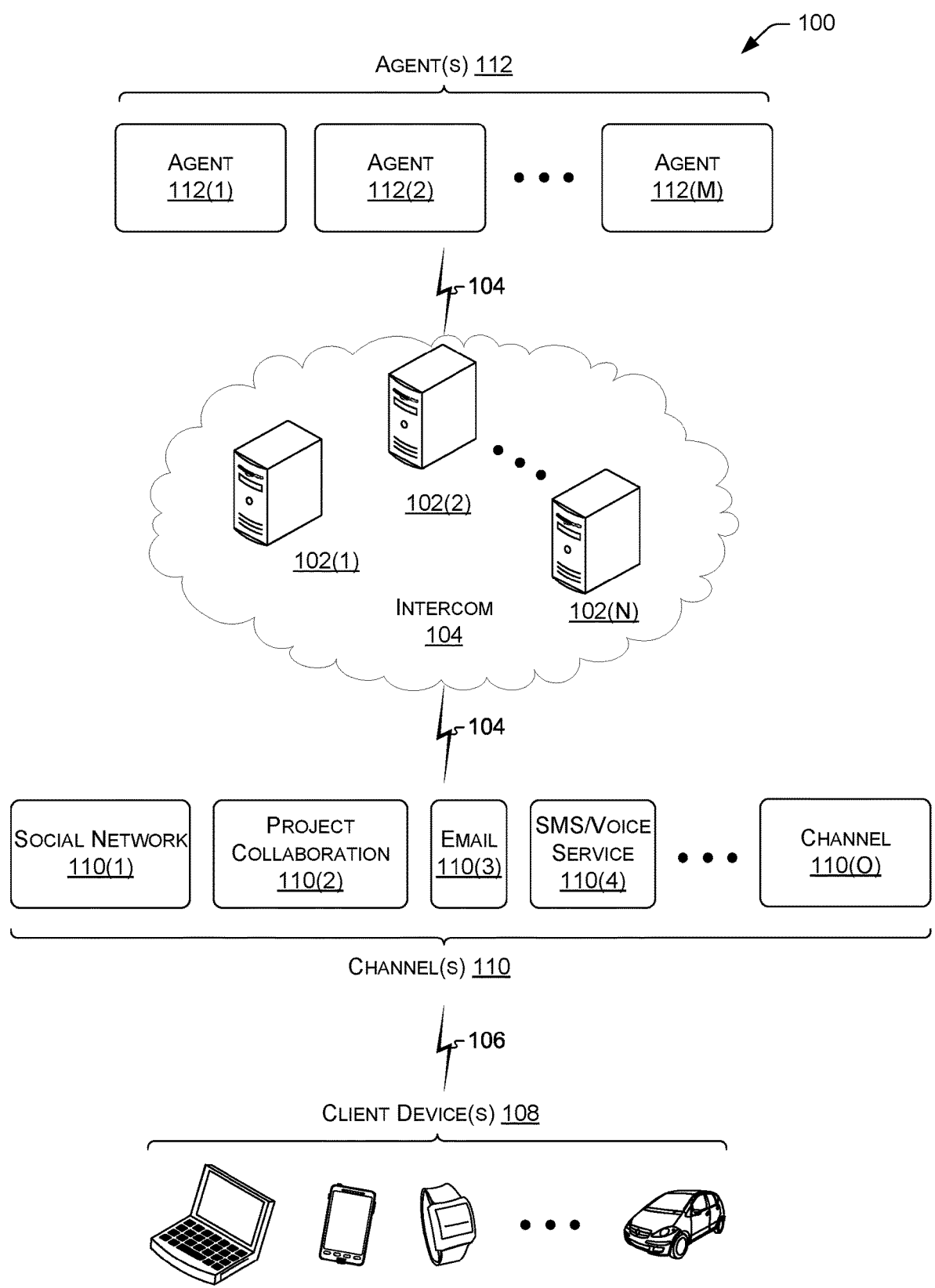
FIG. 1 is a block diagram depicting an example environment usable to implement multi-modal agent intercommunication.

This disclosure is directed to techniques to provide multi-modal agent intercommunication. Examples described herein provide techniques to allow at least one agent to provide dialog-based services to a user over multiple channels without coding the at least one agent for each communication channel. The techniques permit a developer to write instructions for an agent that are agnostic to the channels over which the agent can converse. This changes the structure of the instructions composing the agent itself since sections of instructions comprising communications instructions specific to a channel can be deleted, simplified, or ignored.

In some examples, the techniques can provide this functionality by being programmed to relay communication over any channel and by being provided information associated with an agent sufficient to act on the agent's behalf. In some examples, the techniques can leverage an API endpoint of the agent or some other access point that allows the techniques to make calls to the services of the agent, including responses to user inquiries, for example. The techniques can additionally be provided information sufficient to communicate on behalf of the agent over channels. Such information can include, for example, client ids and client tokens generated for the agent upon registration of the agent with the channels. In some examples, the techniques transform communication received from the agent and sent over a channel to a user device to be suitable for the channel over which a conversation with a user is being conducted. The techniques remove the necessity to recode an agent for each channel for which a developer desires to provide the ability to converse with the agent.

Not only do these techniques reduce developer burdens, but the techniques allow a specific agent to have a portable presence across channels. For example, the techniques allow a user to have a conversation with an agent across channels without losing context of the conversation. For example, mid-conversation the user can switch channels and continue the conversation where the user left off in the other channel and without having to re-initiate with the agent. In some examples, the techniques can include one or more of session tracking, communication logging, and/or user profiles including associated channels to ensure that a user is able to converse with the same agent without losing the context of the conversation. The examples described herein can also provide auxiliary services to maximize the number of channels on which an agent has a presence. The example techniques can also detect the presence of a service trigger in communication of a user that corresponds with a service of an agent. This technique allows an agent and/or the service of the agent to be introduced or to be provided without having to interrupt a dialog to query the agent.

The term "techniques" can refer to system(s), method(s), computer-readable media encoded with instructions, module(s), and/or algorithms, as well as hardware logic (e.g., Field-programmable Gate Arrays (FPGAs), Application-Specific Integrated Circuits (ASICs), Application-Specific Standard Products (ASSPs), System-on-a-chip systems (SOCs), Complex Programmable Logic Devices (CPLDs)), etc. as permitted by the context described above and throughout the document.

Illustrative Environment

FIG. 1 is a block diagram depicting an example environment 100 usable to implement multi-modal agent intercommunication. The environment 100 includes distributed computing resources 102(1)-102(N) that can communicate with one another and with external devices via one or more networks 106. In some examples, the distributed computing resources 102(1)-102(N) can implement the techniques described herein. For example, the distributed computing resources 102(1)-102(N) can include a central service ("intercom 104" herein) to accomplish multi-modal agent intercommunication, which facilitates dialog between at least one agent 112(1) and at least one user device 108 across a plurality of channel(s) 110 without coding a version of the at least one agent 112(1) for each communication channel. In some examples, the example environment 100 can alternately include a single computing resource, such as, for example distributed computing resource 102(1) that implements the techniques herein. In some examples, some or all of the techniques described for the distributed computing resources 102(1)-102(N) can additionally or alternatively be implemented by one or more of the client devices 108. In some examples, a client device 108 can be programmed as the central service.

In some examples, distributed computing resources 102(1)-102(N) includes computing devices such as distributed computing resources 102(1)-102(N). Examples support scenarios where distributed computing resources 102(1)-102(N) can include one or more computing devices that operate in a cluster and/or other grouped configuration to share resources, balance load, increase performance, provide failover support and/or redundancy, and/or for other purposes. Although illustrated as servers, distributed computing resources 102(1)-102(N) can include a diverse variety of device types and are not limited to any particular type of device. For example, distributed computing resources 102(1)-102(N) can include any type of computing device having one or more processing unit(s) operably connected to computer-readable media, I/O interfaces(s), and network interface(s). The distributed computing resources 102(1)-102(N) can have an agent intercom framework stored thereon, the distributed computing resources 102(1)-102(N) having an agent intercom framework stored thereon collectively composing the intercom 104.

In some examples, network(s) 106 can include public networks such as the Internet, private networks such as an institutional and/or personal intranet, or some combination of private and public networks. Network(s) 106 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 106 can utilize communications protocols, including packet-based and/or datagram-based protocols such as internet protocol (IP), transmission control protocol (TCP), user datagram protocol (UDP), and/or other types of protocols. Moreover, network(s) 106 can also include a number of devices that facilitate network communications and/or form a hardware basis for the networks, such as switches, routers, gateways, access points, firewalls, base stations, repeaters, backbone devices, and the like. In some examples, network(s) 106 can include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 1302.11 standards (e.g., 1302.11g, 1302.11n, and so forth), and other standards.

Example environment 100 also includes client device(s) 108. In some examples, the client device 108 can include, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device such as one or more separate processor device(s), such as CPU-type processors (e.g., micro-processors), GPUs, or accelerator device(s). The client device(s) 108 can be any device by which a user may engage in a dialog with another entity.

In some examples, the client device(s) 108 are in communication via channel(s) 110, by which a user can engage in dialog with another entity. In some examples, although FIG. 1 depicts the channel(s) 110 as being in communication with the client device(s) 108 via network(s) 106, as used herein the term "channel" refers to any electronic communication mode or method.

Examples of channel(s) 110 can include social network channel(s) 110(1) (e.g., Facebook Google+®, Twitter®, etc.), project collaboration channel(s) 110(2) (e.g., GroupMe®, GitHub®, Basecamp®, etc.), email service(s) 110(3) (e.g., Outlook®, Gmail®, etc.), SMS and/or voice service(s) 110(4), or any other channel 110(0) by which a client device(s) 108 can engage in dialog with another entity (e.g., AOL Instant Messenger, Gtalk, Slack®, Skype®, Steam®, etc.).

The example environment 100 also includes agent(s) 112 communicatively coupled to the distributed computing resources 102(1)-102(N) via the network(s) 106. Agent(s) 112 can include any dialog service, where, at least in one example, "dialog" can include an exchange of natural language. In some examples, "dialog" can include an artificial language and/or computer code. In some examples, "dialog" can include an exchange of files. Some examples of agent(s) 112 can include, chatbots; intelligent personal assistants (e.g., Siri®, Cortana®, etc.); active directory agents (e.g., agents that respond to user requests regarding information stored in an active directory); payment agents (e.g., agents that facilitate payment on behalf of the user); search engine agents (e.g., agents that respond with search engine results to user inquiries); joke agents (e.g., agents that respond with a joke); goods ordering agents (e.g., agents that act on behalf of a user to complete an order for goods); image annotation agents; calendar agents; agent making agents; agent importing agents; office software agents; reminder agents; internet of things control agents; agents for processing and managing mapping and directional information; agents for use in note-taking, namely, agents for recording and organizing audio information in electronic form; agents for personal information management; agents for organizing and accessing phone numbers, addresses, and other personal contact information; agents for accessing, browsing and searching online databases; agents for providing consumer resources for searching, locating, rating, evaluating and providing directions for the purchase, consumption and use of a wide range of consumer products, services, and information over a global communications network and using any connected access mode in any format, namely, mobile communication devices, desktop internet, email, voice or social media channels; agents for global positioning and for providing travel directions; agents for enabling hands-free use of a mobile phone through voice recognition; agents for making travel arrangements; agents to assist in making reservations at hotels and restaurants, agents for providing weather information, etc.

In some examples, agent(s) 112 are proprietary computer software in the field of natural language, speech, speaker, language, voice recognition, and voice-print recognition; computer services, namely, assisting others with the implementation, use and operation of computer hardware, computer software, and consumer electronics; technical support services, namely, troubleshooting of computer software problems; computer services, namely, providing assistance in developing computer systems, databases and applications; providing information in the fields of computer hardware and software development; application service provider (ASP) services featuring hosting computer software applications of others; or ASP services featuring computer software and providing online non-downloadable software, namely, computer software for creating, authoring, distributing, downloading, transmitting, receiving, playing, editing, extracting, encoding, decoding, displaying, storing and organizing text, graphics, images, audio, video, and multimedia content, and electronic publications.

In some examples, agent(s) 112 can include software, hardware, human resources, or any combination thereof. In some examples, the agent(s) 112 can include Amazon Mechanical Turk® ("MTurk") or other crowdsourced human resources, either in whole or in part. For example, an agent registered with the intercom 104 at the distributed computing resources 102(1)-102(N) can leverage the MTurk API to submit MTurk requests and return the results via the intercom. In some examples, agents can act on behalf of a user using a client device 108. In some examples, the scope of an agent's permission to act on behalf of a user depends on permissions granted to the agent by the user. For example, the may be prompted to opt-in to use the services of the agents.

In some examples, an agent can include software coded for a single standard or channel. That is, software composing the agent can be agnostic to the type of channel(s) over which the agent communicates and therefore the agent can be coded to function with one type of channel or can be coded without any specificity as to a channel. Since, in some examples, the intercom 104 transforms messages sent to and from agents 112 to formats corresponding to respective channels 110, the agent does not need to be coded for a specific channel and does not need to be coded for each channel. In some examples, the techniques discussed herein facilitate communication between a user device and at least one agent 112(1) via any one of a plurality of channels, the agent being a single application. In other examples not utilizing the intercom 104, an agent comprises one application per channel, where the various applications composing the agent are each coded to conform to one channel. In yet other examples where the intercom 104 is not utilized, the agent comprises multiple modules, the modules programmed to conform messages to multiple channels, respectively.

Although FIG. 1 depicts a distributed system where the agent(s) 112 are depicted as communicating over network(s) 106 with the distributed computing resources 102, the agent(s) 112 can be stored at the distributed computing resources 102(1)-102(N) in some examples. In some examples, the agent(s) 112 can be stored remotely, as depicted. For example, the agent(s) 112 can be part of a web service, accessible by an application programming interface (API).

Figure 2:
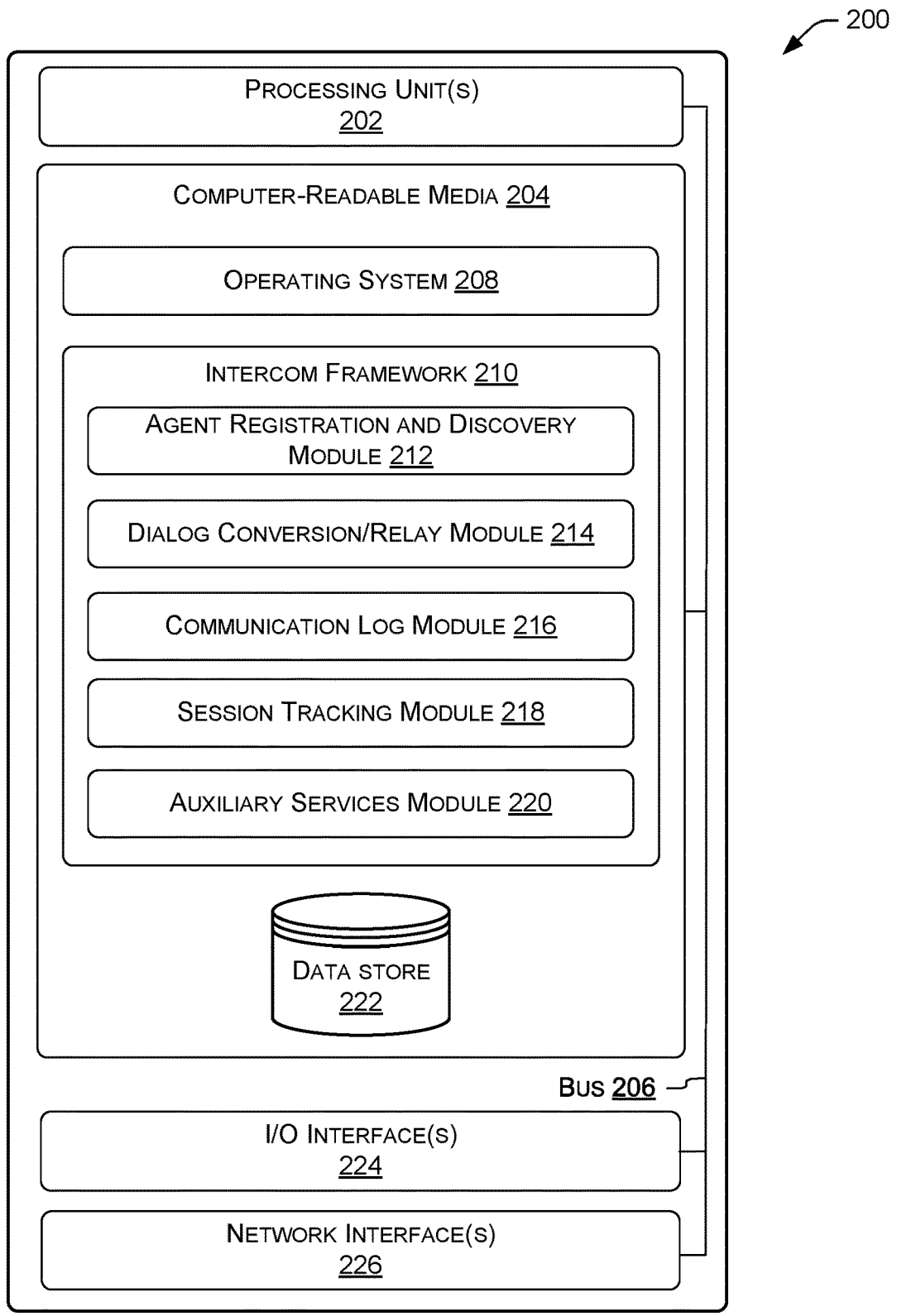
FIG. 2 is a block diagram depicting an example device that can implement multi-channel agent intercommunication, according to various examples.

FIG. 2 depicts an example device 200, which can represent one or more computing resources of the distributed computing resources 102, the user device(s) 108, or other computing devices implementing some or all of the multi-modal agent intercommunication techniques described herein. Example device 200 can include any type of computing device having one or more processing unit(s) 202 operably connected to computer-readable media 204. The connection may be via a bus 206, which in some instances may include one or more of a system bus, a data bus, an address bus, a PCI bus, a Mini-PCI bus, and any variety of local, peripheral, and/or independent buses, or via another operable connection. Processing unit(s) 202 can represent, for example, microprocessors, controllers or any other suitable type of processors for processing computer executable instructions to control the operation of the device in order to facilitate multi-channel agent intercommunication. In some examples, where a system on a chip architecture is used, the processing unit(s) 202 can include one or more fixed function blocks (also referred to as accelerators) which implement a part of the method of employing an intercom 104 in hardware (rather than software or firmware).

The computer-readable media 204 includes two types of computer-readable media, namely computer storage media and communication media. Computer storage media can include volatile and non-volatile, non-transitory machine-readable, removable, and non-removable media implemented in any method or technology for storage of information (in compressed or uncompressed form), such as computer (or other electronic device) readable and/or executable instructions, data structures, program modules, and/or other data to perform processes or methods described herein. Computer storage media includes, but is not limited to hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/or other types of physical machine-readable media suitable for storing electronic instructions.

In contrast, communication media embodies computer-readable instructions, data structures, program modules, and/or other data in a modulated data signal, such as a carrier wave, and/or other transmission mechanism. As defined herein, computer storage media does not include communication media.

Example device 200 can include, but is not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, and/or any other sort of computing device such as one or more separate processor device(s), such as CPU-type processors (e.g., micro-processors), GPUs, and/or accelerator device(s).

In some examples, as shown regarding device 200, computer-readable media 204 can store instructions executable by the processing unit(s) 202, which can represent a CPU incorporated in device 200. Computer-readable media 204 can also store instructions executable by an external CPU-type processor, executable by a GPU, and/or executable by an accelerator, such as a Field Programmable Gate Array (FPGA)-type accelerator, a digital signal processing (DSP)-type accelerator, and/or any internal or external accelerator.

Executable instructions stored on computer-readable media 202 can include, for example, an operating system 208, an intercom framework 210, and other modules, programs, and/or applications that can be loadable and executable by processing units(s) 202. The intercom framework 210 can include agent registration and discovery module 212, dialog conversion/relay module 214, communication log module 216, session tracking module 218, and/or auxiliary services module 220. The techniques can be deployed in more or less modules. As mentioned above, the functionally described herein can be performed, at least in part, by one or more hardware logic components such as accelerators. For example, and without limitation, illustrative types of hardware logic components that can be used include FPGAs, Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU core embedded in an FPGA fabric.

In the illustrated example, computer-readable media 204 also includes a data store 222. In some examples, data store 222 includes data storage such as a database, data warehouse, and/or other type of structured or unstructured data storage. In some examples, data store 222 includes a relational database with one or more tables, indices, stored procedures, and so forth to enable data access. Data store 222 can store data for the operations of processes, applications, components, and/or modules stored in computer-readable media 204 and/or executed by processor(s) 202, and/or accelerator(s), such as modules 212-220. For example, data store 216 can store an agent database, agent data, user profiles, value-added service data, version data, iteration data, clock data, and other state data stored and accessible by the intercom framework 210. Alternately, some or all of the above-referenced data can be stored on separate memories such as memories of the distributed computing resources 102(1)-102(N), client device(s) 108, agent(s) 112, a memory on board a CPU-type processor (e.g., microprocessor(s)), memory on board a GPU, memory on board an FPGA type accelerator, memory on board a DSP type accelerator, and/or memory on board another accelerator).

Device 200 can further include one or more input/output (I/O) interface(s) 224 to allow device 200 to communicate with input/output devices such as user input devices including peripheral input devices (e.g., a keyboard, a mouse, a pen, a game controller, a microphone or audio input device, a touch input device (e.g., touch screen, touch pad, etc.), a gestural input device, camera(s), and the like) and/or output devices including peripheral output devices (e.g., a display, a printer, audio speakers, a haptic output, bone conduction for audio sensation, and the like). In some examples, the I/O interface(s) 224 can be used to communicate with client device(s) 108 or agent(s) 112. Device 200 can also include one or more network interface(s) 226 to enable communication between computing device 200 and other networked devices such as client device(s) 108 and/or agent(s) 112. Such network interface(s) 226 can include one or more network interface controllers (NICs) and/or other types of transceiver devices to send and/or receive communications over a network, such as network(s) 106.

Example device 200 includes an example intercom framework 210 that can be distributively or singularly stored on device 200, which, as discussed above, can include one or more devices such as distributed computing resources 102(1)-102(N). Some or all of the modules can be available to, accessible from, or stored on a remote device and/or distributed computing resources 102, which can be configured as a cloud services system. In some examples, an intercom framework 210 includes modules 212-220 as described herein that provide multi-channel agent intercommunication. In some examples, any number of modules could be employed and techniques described herein as employed by one module can be employed by a greater or lesser number of modules.

The agent registration and discovery module 212 can include computer-executable instructions that, when executed, program processing unit(s) 202 to register agents and facilitate discovery of the agents by users. In some examples, to register agents the agent registration and discovery module 212 can be configured to receive information regarding an agent which it can store in a directory of agents. In some examples, the agent registration and discovery module 212 can store the directory of agents in the data store 222 or in separate memories. In some examples, the information composing the directory of agents can include one or more of agent names, agent descriptions, agent API endpoint references, agent keys for linked channels (e.g., client token, client id, etc.), agent account information (e.g., miscellaneous data necessary for intercom 104 to act on the agent's behalf if agent keys are not available), agent publisher identities, agent publisher emails, agent associated websites, agent icons, agent owners, identifications of an agent language, hashtags, and/or indications of desired value-added services.

In some examples, the intercom 104 can make calls to the agent API via the API endpoint references to send and receive messages, files, and/or other communication on behalf of the agent. Calls by the intercom 104 to the agent API can also cause the agent to perform services associated with the agent. It is contemplated that other suitable configurations to interface with the agent can be used. For example, if the agent comprises and/or relies upon human resources, at least in part, other interfaces can be used such as a user interface such as a graphical user interface, a natural language interface, a menu, a form, command line, etc. In some examples, the agent registration and discovery module 212 can also be used to register new channels. For example, if a new channel is developed, the agent registration and discovery module 212 can receive information about the new channel sufficient to transform messages sent to the agent from the new channel and received from the agent to be relayed over the new channel. Such information can include API endpoints, agent keys for accessing the new channel, channel communication protocols, channel constraints, channel fidelity, etc. In some examples, added new channels can be available to all users (i.e., published to all developers) or added new channels can selectively be available only to certain users (e.g., authorized users) or in certain scenarios (e.g., when certain conditions are met).

In some examples, agent registration and discovery module 212 can facilitate linking an agent to a channel. As used herein, "linking" can include authenticating, associating, providing information sufficient such that the intercom framework 210 can facilitate communication between at least one agent 112(1) and at least one user device such as by sending and receiving messages on behalf of the at least one agent 112(1) via a channel, etc. In some examples, the agent registration and discovery module 212 is configured to receive agent keys (e.g., a client id and client secret or token) for channels to which the agent has been linked. In some examples, the module can provide a guide to set up an account for the agent on a channel and/or authenticate the agent on the channel (e.g., authorization schemes for interacting with a channel's service via its exposed API). In some examples, once registered via agent registration and discovery module 212, the intercom 104 can use data stored in the agent directory to make requests on behalf of an agent, such as requests to send and/or receive messages and/or files over the channel.

Furthermore, in some examples, the agent registration and discovery module 212 can also collect information to include in a user profile, which the agent registration and discovery module 212 can maintain in the data store 222 or other memories. In some examples, the user profile can include one or more of a user identification, user device associations, states of user devices, states of user device interaction with agents, states of user device interaction with channels, agents linked to channels associated with the user (e.g., agents that have been added to a conversation by a user, agents with which the user communicates directly, etc.), language(s) of the user, biographical data of the user, communication logs associated with the user, analytics related to the communication logs developed by auxiliary services module 220, etc. In some examples, the intercom framework 210 can use the user profile to tailor communication to the user based at least in part on one or more of the data composing the user profile described above.

In some examples, dialog conversion/relay module 214 can include computer-executable instructions capable of configuring processing unit(s) 202 to facilitate dialog between at least one agent 112(1) and at least one user device across a plurality of channels without coding a bot for each communication channel. In some examples, the dialog conversion/relay module 214 can include computer-executable instructions capable of retrieving data from a directory of agents (e.g., agent-side of intercommunication layer) and/or user profiles (e.g., client-side of intercommunication layer). In some examples, the dialog conversion/relay module 214 functions as a proxy layer between at least one agent 112(1) and at least one user device via a channel. In some examples, the dialog conversion/relay module 214 can act on behalf of an agent to send and/or receive communication and/or take other actions over a channel (e.g., communication between the intercom 104 and the user device via a channel) and send and/or receive communication from at least an API endpoint associated with the agent (e.g, communication between the agent and the intercom) in order to facilitate dialog between the agent and a user device. In some examples, the dialog conversion/relay module 214 can send and/or receive a communication and/or take other actions on behalf of the agent. In some examples, the dialog conversion/relay module 214 can take such action on behalf of the agent with other agents or over other services, such as, for example, search engine requests, order processing, human input requests, etc. For example, the dialog conversion/relay module 214 can send requests on the behalf of the agent to other agents and relay responses of the other agents to the agent.

In some examples, the dialog conversion/relay module 214 is configured to ensure that dialog between an agent and a user device via a channel conforms to constraints of the channel and/or supports disparate channel fidelities even when the agent is written to support limited channel fidelities. For example, the dialog conversion/relay module 214 can include computer-executable instructions capable of configuring processing unit(s) 202 to conform communication provided to a channel from an agent to constraints of that channel and vice versa. For example, if an agent was written for Slack®-related services, which allows for posting images, and the channel that is dialoging with the agent is an SMS channel, the dialog conversion/relay module 214 can respect the constraints of the SMS channel and convert messages from the agent to 140-character messages and include images as links in the 140-character messages that are hyperlinked to the image content. Therefore, the agent having the Slack®-related services doesn't need to be re-written for the SMS channel. Similarly, in some examples, the dialog conversion/relay module 214 can modify fidelity of received and sent communication based on agent and/or channel fidelity, respectively. Low fidelity channels include channels with more sparse content, such as, for example, SMS, messaging, email, web pages, surveys, other questionnaires, other forms, etc. High fidelity channels are more content rich, such as, for example, voice, video-conferencing, hologram, etc. In some examples, the dialog conversion/relay module 214 can interface with the auxiliary services module 220 to facilitate dialog between an agent and a channel of disparate fidelities. For example, if an agent was written as a questionnaire web-based form, modules 214 and 220 can convert questions of the questionnaire into natural conversational language audio using suitable text-to-voice conversion techniques to provide to the user via the channel and convert received voice or other responses from the user to textual inputs to provide to the agent. Similarly, audio can be converted to video via speech-to-video techniques.

This example also illustrates the capability of the intercom framework 210 to provide multi-modal conversation. In some examples, the dialog conversion/relay module 214, the auxiliary services module 220, the session tracking module 218, and/or other modules can determine a format of communication most suitable for a channel and context. For example, a high fidelity channel can be capable of sending and receiving many forms of communication but not all or certain ones of the forms can be useful in certain instances. For example, a high fidelity channel can be capable of video, voice, and text communication simultaneously. The intercom framework 210 can be aware of the fidelity of the channel (e.g., by information provided regarding the channel and stored at the intercom 104) and can be capable of communicating via all of these formats simultaneously. Alternatively, the intercom framework 210 can choose one or more formats or switch between formats of communication depending on the context. For example, if part of an agent's response during a dialog with a user includes information that needs to be saved for later, it may be more appropriate to provide that information via text so that the user can more easily capture it, even if the user was previously video chatting with or voice-calling the agent. In some examples, the intercom framework 210 can transition between or add various formats of communication. In some examples, the user can direct the intercom 104 to transition between or add communication formats. For example, a user may be dialoging with an agent via an email channel, but the user may want the bot to continue the dialog via telephone with the user or another person. The dialog conversion/relay module 214 can transform from email message to speech dialog sent to the channel. The dialog conversion/relay module 214 can also transform communication received from channels to a form intelligible by the agent and/or an API of the agent. Moreover, to facilitate conversion of communication to be appropriately formatted for specific channels, the dialog conversion/relay module 214 can store a database comprising channel format information (e.g. schema information, protocol information, fidelity information, encryption schema information, etc.). In some examples, the database can further comprise associations between required information to formulate communication (e.g., text data composing a message for a text channel, video data composing a streaming video message for a video channel, etc.) on a channel, agent outputs, and auxiliary services to call to transform agent outputs to a format acceptable for a channel.

Furthermore, the intercom framework 210 can ensure that the conversational context of the conversation can be preserved through changes of the channel which a user is using. In some examples, the intercom framework 210 can capture and store communication via the communication log module 216.

In some examples, the intercom framework 210 can determine a best format for the communication based at least in part on a conversational context of the conversation (e.g., from natural language processing provided by the auxiliary services module 220, etc.), a context of the user, a use context, a user device status, a channel status, agent service type, service trigger type, information contained in a user profile, information in the agent directory, etc.

A user can initiate dialog with an agent in a variety of ways, depending on the channel with which the user wants to dialog with the agent. In some examples, the user may not be aware of the channel type (e.g., a user encounters a kiosk linked to the agent). In some examples, for some channel types, the user can initiate communication with an account associated with the agent. For example, the user could send an SMS to a phone number associated with the agent, an email to an email account associated with the agent, a chat to a profile associated with the agent, a message directed to a social network profile associated with the agent, etc. In some examples, the user having a user profile maintained by the intercom framework 210 can associate an agent with the user profile and thereby gain access to the agent. In some examples, the user can add the agent as a contact within a channel. In some examples, the agent can have multiple identities as contacts in multiple channels. In some examples, by adding to one channel an agent contact with multiple identities across multiple channels, a user can add the agent across up to all of the multiple channels. In other examples, the user can additionally or alternatively initiate communication with an agent by adding the agent to a contact list or by adding the agent to a discussion group. For example, a user can add the agent to a group discussion or other collaborative communication channel.

In some examples, the dialog conversion/relay module 214 can pass the dialog between channels. The decision to move dialog to another channel, to add a form of communication to the channel, or to add a channel can be based, at least in part, on data collected by the session tracking module 218 in some examples. In some examples, session tracking module 218 can track session data such as, for example, a channel-in-use by the user, active/inactive status of client device(s) and/or channel(s), analytics regarding use of channel(s) and/or client device(s) (e.g., time of day, locations, purposes, for which channel(s) and/or client device(s) are used), channels more or less commonly used on different client devices, dialog data, identities of parties communicating in a dialog, etc. In some examples, session tracking module 218 can detect a change in a channel-in-use by a user based at least in part on one or more of volume of user activity, a cessation of communication via one channel and a start or continuation of communication in a second channel, time of day, an active status, a channel that a user has indicated is the channel-in-use, a preferred channel, a channel from which most-recent communication has been received, or a channel preferred to be the channel-in-use based at least in part on one or more of a time, a location of the user, an IP address associated with communication received from the channel, a calendar event, or a status of a device.

In some examples, the communication log module 216 can capture at least part of communication composing dialog between at least one agent 112(1) and user device(s). I some examples, the communication log module 216 can store the communication in a communication log. In some examples, the communication log module 216 may retain communications in the communication log for a duration of time from the time it was first stored and then the communication log module 216 can delete the data (e.g., for the duration of a dialog, for a user pre-defined duration, until a user dissociates from an agent, until a user profile associated with the communication log is deleted or deactivated, for a week, for a year, for five years). In some examples, the communication log module 216 can encrypt the communication log. In some examples, the communication log can be secured by security policies of the device 200. In some examples, the communication log module 216 can provide an option to a user to begin, stop, or never log communication. The communication module 216 can also allow a user to select format(s), channel(s), and user device(s) from which communication logs can be captured and/or stored. In some examples, the user can also select value-added services (e.g., services of the auxiliary services module 220) and/or agent(s) that have permission to access the communication log.

In some examples, the communication log can be accessed by the auxiliary services module 220, the dialog conversion/relay module 214, or the session tracking module 218 to facilitate fluid dialog between an agent and the user. For example, the auxiliary services module 220 can include a message-intelligent service that uses natural language processing, disambiguation, and/or other processing methods to detect service triggers, cultural context of a user, and/or other biographical data about a user from a communication log and/or ongoing dialog. As referred to herein, any catalyst for interaction with an agent can be referred to as a "service trigger," whether that is through a direct query to the agent, dialog with the agent, detecting the applicability of a service provided by the agent as discussed above, etc. In some examples, service triggers are portions of user communication that are associated with one or more services of one or more agents. To identify service triggers, the auxiliary services module 220 can include natural language processing, voice-to-text techniques, video-to-text techniques, and/or other semantic disambiguation techniques and techniques that convert dialog to a format useable by the natural language processing services to identify when a service of an agent may be relevant. In some examples, the auxiliary services module 220 can be programmed to continuously monitor dialog for service triggers. In other examples, the auxiliary services module 220 can be programmed to monitor dialog for service triggers at the user's direction, during a time of day, on particular channel(s), between the user and particular agent(s), for agent(s) having a certain level of permissions, etc.

For example, if one user sends another user a communication including a time, place, people, and locations, the auxiliary services module 220 can detect one or a combination of these to include a service trigger associated with services associated with an agent in the agent directory. For example, one or a combination of a time, place, people, and location can be related to a service trigger for one or more of a calendar service, an open-time-finding service, a food ordering service, a directions service, etc. In that example, the dialog conversion/relay module 214 can ask either or both users if they would like to have meeting data added to their calendars or whether they want to be introduced to an agent with which they have not associated and that provides a service associated with the service trigger detected. In some examples, agents can "hand off" or introduce other agents. For example, the intercom framework 210 and/or an agent in dialog with a user can determine that a detected service trigger is either outside the scope of the services associated with the agent or that another agent can provide more robust services of the type of the service trigger detected. In these instances, the agent and/or the intercom framework 210 can offer to introduce one or more other agents that are associated with services associated with the service trigger (e.g., add the one or more other agents to the dialog or query agent-to-agent while keeping the dialog open between the user and the agent without adding the queried agent(s)) or can offer to change the entity with which the user is dialoging (i.e., "hand off"). In some examples, the message-intelligent service of auxiliary services module 220 can detect topics, tasks, entities, intents, etc., that can function as service triggers.

In some examples, the auxiliary services module 220 can also detect a cultural context and/or other biographical data associated with a user from the communication log or an ongoing dialog with at least one agent 112(1). In some examples, cultural context can include language(s) spoken and/or understood by a user, dialect, geographical location, demographic information, level of education, occupation, estimated sex, estimated gender, etc. The auxiliary services module 220 can use the cultural context to modify communication to and from an agent to fit the cultural context. For example, the auxiliary services module 220 can include translation services to translate a language of a user to a language of a bot and/or other service and vice versa and/or to modify vocabulary, tone, pitch, gender, and/or intonation, etc., of communication composing the dialog, whether the communication provided to the agent and/or the communication provided to the channel.

In some examples, the auxiliary services module 220 can also include face detection and recognition services, emotion detecting services, beauty detecting services, computer vision services, video understanding and transformation services, image understanding and transformation services, speech recognition services, speaker recognition services, spell check services, Language Understanding Intelligent Service (LUIS), web language model services (e.g., extended natural language processing), etc. In some examples, the services can be embodied as or accessible by APIs. In some examples, the services described herein composing the auxiliary services module 220 can receive as an input either communication sent from an agent to a user or communication received from a user intended for the agent. The services can relay their output to the intended party, whether the agent or the user. In some examples, the auxiliary services module 220 can comprise machine learning algorithms to enhance the one or more services of auxiliary services module 220 and/or the other modules of the intercom framework 210 using one or more communication logs and/or ongoing dialog.

In an example instance to illustrate some of these techniques, an agent can include a burrito-ordering agent. A user can discover the agent's existence one of a variety of methods, such as through an agent gallery online or through a physical advertisement, and contact the agent via a channel or add the agent to a channel used by the user. The agent registration and discovery module 212 can relay to the agent messages received from a user device via a channel pertaining to a burrito order. In this example, a burrito order comprises multiple service triggers. A burrito order comprises multiple parts such as an identity of an entity from which the burrito may be purchased, information about the burrito to be ordered, payment, and delivery/pickup arrangements. Each of these details of the order can act as service triggers that may implicate the services of one or more agents. In some examples, the agent registration and discovery module 212 can facilitate dialog between at least one of the agents whose services may be applicable with a user, and facilitate queries between agents in order to formulate satisfactory dialog (e.g., a burrito restaurant agent can contact a payment agent and a search engine map agent to arrange payment and provide driving directions to a restaurant, respectively). In other examples, the agent registration and discovery module 212 can facilitate inclusion of second or more agents in the dialog with the user (e.g., the user is introduced to the other agents or the user can be handed off to another agent to dialog with that agent about a service provided by that agent). The agent can request the intercom framework 210 query other bots (e.g., scheduling agent, payment agent) or other services (e.g., search engines) in order to formulate responses to the user device in a dialog regarding a burrito order.

Example User Interfaces

Figure 3A:
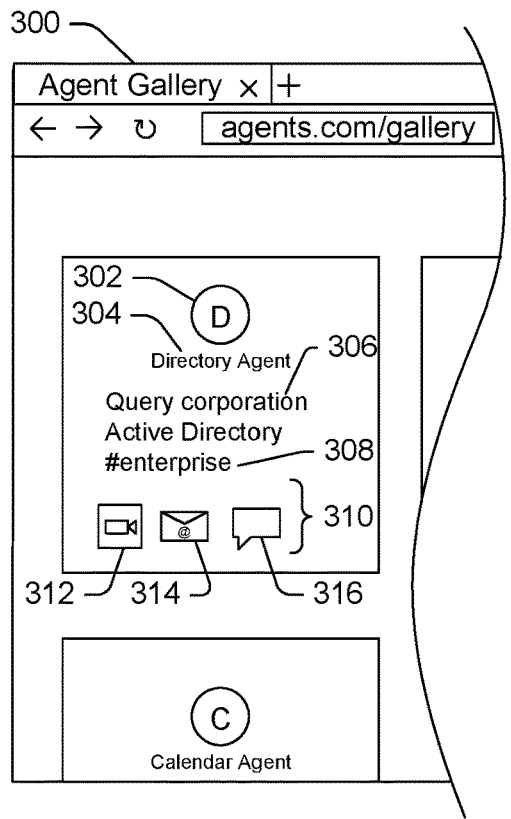
FIG. 3A is an example user interface for displaying an agent gallery usable to linked agents with channels associated with a user profile.

FIGS. 3A-3D depict an example user interface 300 through which the techniques can be deployed. In particular, FIGS. 3A-3D depict an example user interface for a website designed to allow a user to link an agent to a user profile via a particular channel (with channels already so linked also illustrated). FIG. 3A depicts a portion of an example agent gallery, the agent gallery including depictions (302) of particular agents, agent names (304), agent descriptions (306), agent hashtags (308), and channels to which an agent has been linked (310). In some examples, agent galleries can be publicly viewable and discoverable. In some examples, agent galleries or certain agents of the plurality of agents composing the agent gallery can be non-discoverable by the public and can require a user profile to view. In some examples, agent galleries can facilitate discovery of agents by users and provide information about the channels linked to a user profile that the user has also linked to an agent.

For example, FIG. 3A depicts a Directory Agent designed to provide information to a user regarding information from an active directory for a corporation. The gallery includes an "enterprise" hashtag to allow a user to filter agents by that hashtag. In the depicted example, a user has already linked the Directory Agent to the user's accounts on a mixed media service channel (e.g., Skype, etc.) (icon 312), an email service (icon 314), and a telephone service (e.g., an SMS service, a call service, etc.) (icon 316). Note that, in some examples, a user's accounts for channels can be associated with the user's profile maintained by the intercom. In some examples, the intercom 104 can maintain the user profile including the user account associations without storing user credentials for the user accounts. In some examples, the intercom 104 can maintain the user profile including the user account associations by storing user names or similarly publicly discoverable data, but not private data such as, for example, passwords.

Figure 3B:
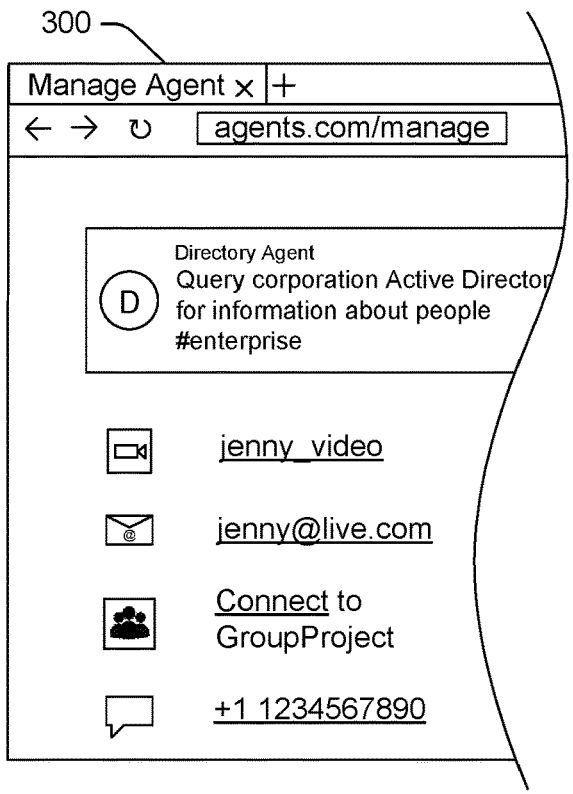
FIG. 3B is an example user interface for managing channel associations with an agent.
Figure 3C:
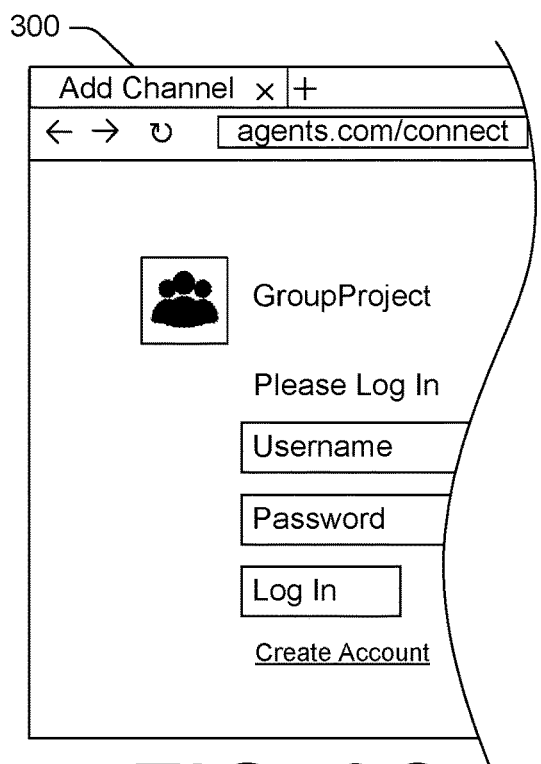
FIG. 3C is an example user interface for linking an agent to a user profile via a particular channel.
Figure 3D:
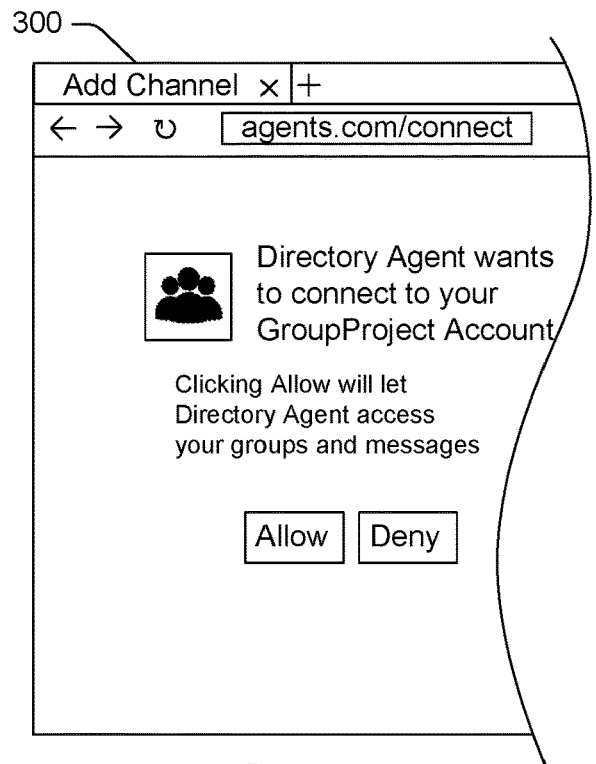
FIG. 3D is an example user interface for granting an agent permission to access a user's groups and messages.

FIG. 3B depicts an example user interface for managing channels to which an agent can be linked. The example user interface displays user information for the three channels to which the Directory Agent has already been linked. The example user interface displays an option to connect to a project collaboration channel called "GroupProject." By selecting this link, the user interface transitions to the use example user interface depicted in FIG. 3C, which can provide an authentication interface for providing credentials to the project collaboration channel. In some examples, the credentials are supplied to the channel directly and the intercom 104 facilitates the authentication. In some examples, the intercom 104 can be agnostic to the credentials because the intercom 104 can store an API endpoint for the agent and channel credentials for the agent. In this example, a user need only permit an agent to access messages and/or groups and/or to be authenticated on a user profile stored by the intercom. In some examples, a user can initiate communication with an agent by messaging an account associated with the agent and/or adding the agent to a conversation. FIG. 3D depicts an example user interface for granting an agent access to messages and/or groups, thereby linking the agent to a channel associated with a user profile.

Agent registration and discovery module 212 can include computer-executable instructions to configure processing unit(s) 202 to render the user interface 300 via a display (via I/O interface(s) 224).

Figure 4:
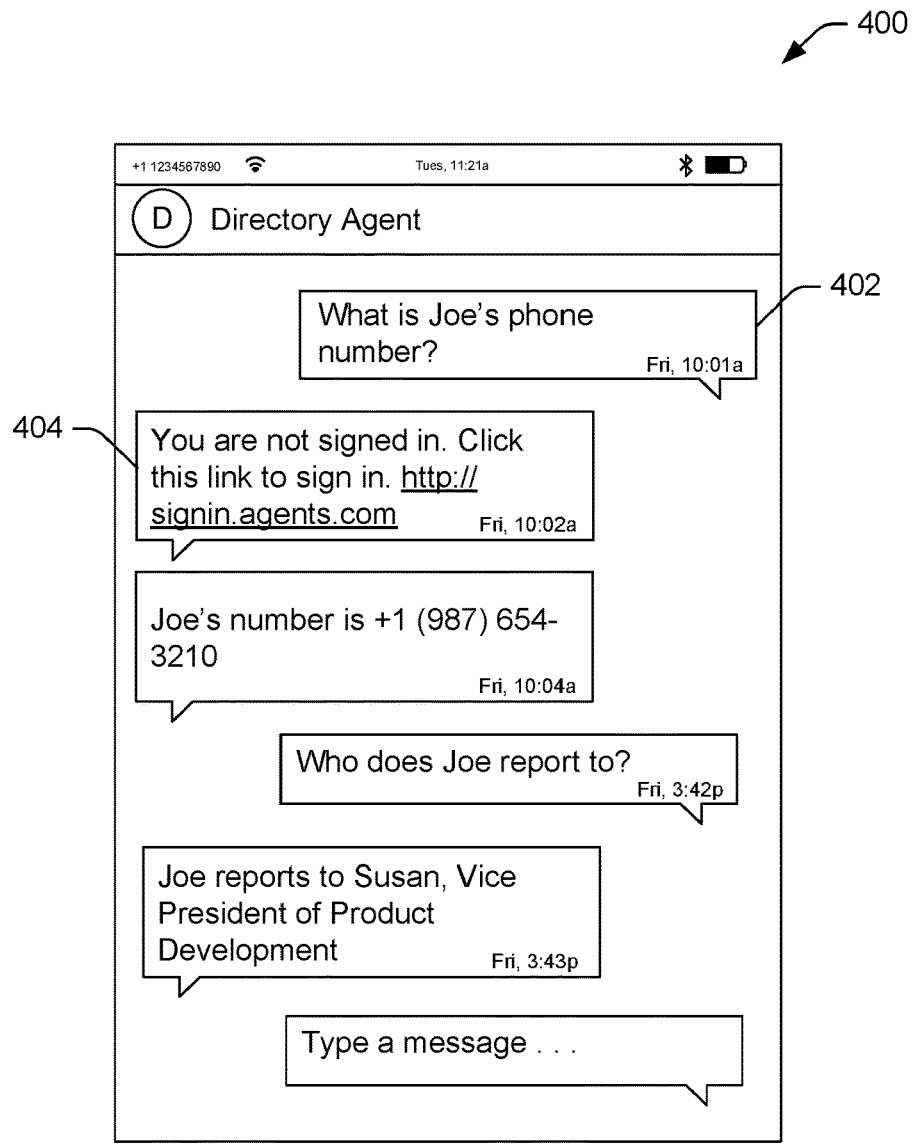
FIG. 4 is an example user interface illustrating an interaction with a directory agent via a telephone service channel.

FIG. 4 depicts an example user interface 400 for dialoging with an example agent (Directory Agent) over a telephone service channel (e.g., SMS channel). In some examples, as in the example illustrated, dialog with an agent can be conducted by messaging a phone number linked to the agent, the phone number, API endpoint, and key for the agent being stored by the intercom 104 in some examples. In the example depicted in FIG. 4, the dialog includes a user query 402 regarding directory information. The intercom, having access to the API endpoint and key for the agent and therefore being able to receive and send messages on the agent's behalf, can detect whether the user device from which the message has been sent has permission to access resources accessible to the agent, such as, in this example, an active directory. Although the user may be logged into an intercom 104 user profile, the agent can additionally require authentication in some examples. In the depicted example, the agent responds via the intercom 104 to the user query 402 with a request for further authentication 404. Upon authentication, the agent continues the dialog and responds to the user query.

Figure 5:
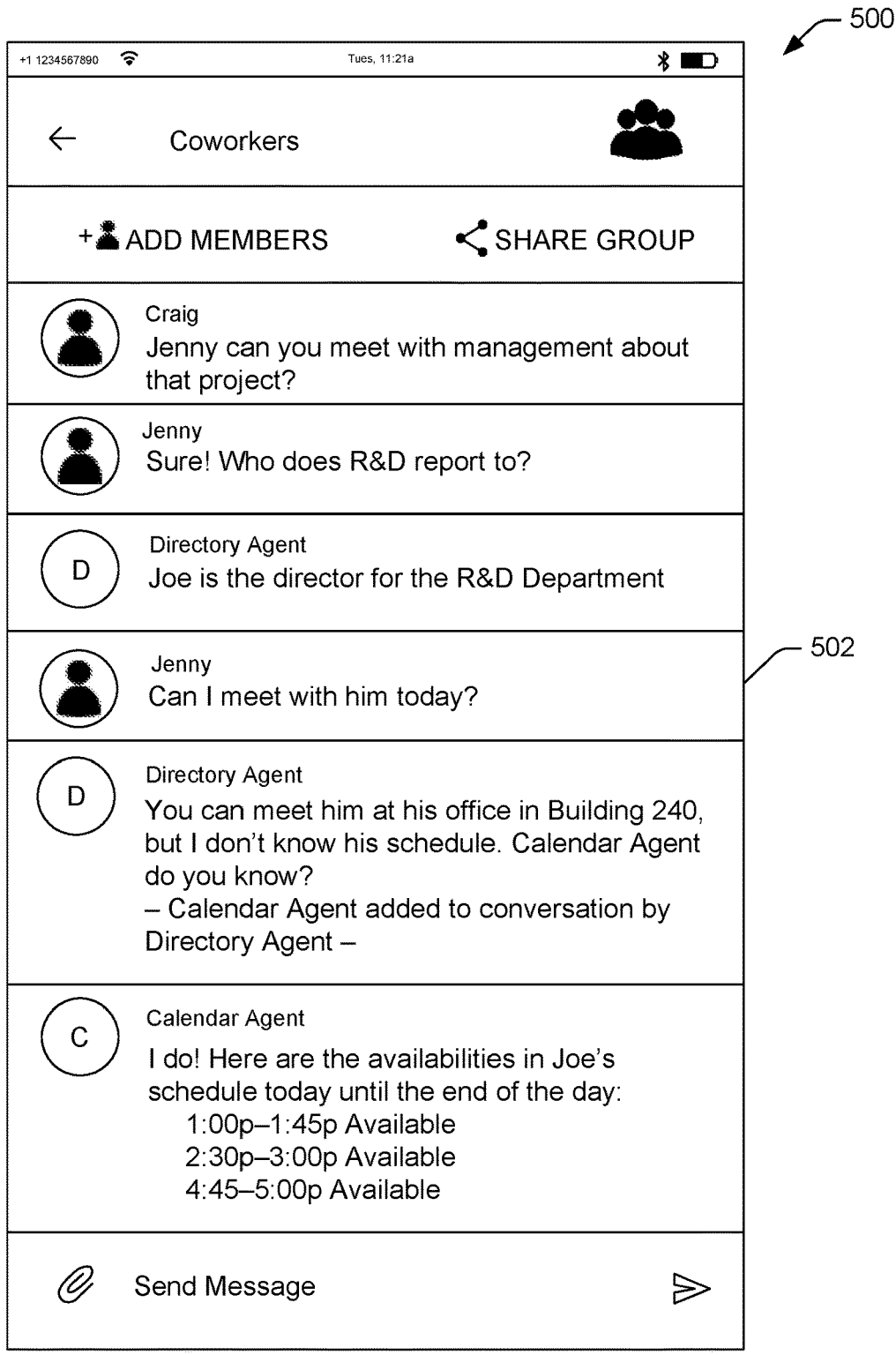
FIG. 5 is an example user interface illustrating an interaction with a directory agent via a group project application.

FIG. 5 depicts an example user interface 500 for dialoging with an example agent (Director Agent) over a group collaboration application. In this example, the example agent has been previously added to the discussion as a member of the group discussion, "Coworkers." In some examples, in similar examples, the intercom 104 can provide value-added services such as natural language processing and/or disambiguation to detect when a service associated with the agent is relevant to the conversation. Based at least in part on this detection, the intercom 104 can form a query to the agent to obtain a response from the agent that the intercom 104 can provide to the group. In some examples, the intercom 104 can format the query to conform with queries typically made to the agent. For example, a member of the group may make a comment regarding a certain topic without querying the agent and the comment made by the group member may not, without modification, elicit a useful response from the agent. The intercom, using natural language processing, can detect that the topic is relevant to a service of the agent and can form a query to the agent regarding the topic and provide the agent response to the group as an agent suggestion, where an agent suggestion is communication from the agent when the information was not requested by a user.

FIG. 5 also depicts an example of an "introduction" between agents. At 502, Jenny asks a question that can potentially be interpreted to be related to both an individual's schedule and, due to the nature of scheduling, a location of the individual. In some examples, the intercom 104 can facilitate dialog with a second agent having services related to the service trigger. The intercom 104 can facilitate dialog with the second agent when a first agent does not provide a service composing the service trigger and the second agent does, when a user has indicated a preference of the second agent for one or more service types and the service trigger is associated with one of those service types, when the second service provides a service more adequately or satisfactorily, etc.

Returning to the example, Directory Agent can provide Jenny information from an active directory that relates to meetings (e.g., where an individual can be met), and the intercom 104 can insert a second agent (Calendar Agent, for example) into the dialog. In some examples, the intercom 104 can ask for permission to introduce the second agent before facilitating conversation with the second agent. In some examples, the intercom 104 can be configured to associate agents on behalf of a user so that "hand offs" and "introductions" may go more smoothly. In other examples, the intercom 104 can request the user associate the second agent with the channel. In another un-depicted example, Directory Agent can query Calendar Agent through the intercom framework 210 to receive data related to the service trigger at 502 and relay Calendar Agent's response to the intercom framework 210 which, in some examples, can then relay the message to the channel on behalf of the Directory Agent.

FIG. 6 illustrates an example user interface 600 for registering an agent. In some examples, the information received can be stored in an agent directory. The user interface 600 illustrates some examples of a user interface for collecting the data discussed above in regard to the agent registration and discovery module 212. FIG. 6 also depicts the ability for an agent registrar to select value-added services to activate for the agent (602). In some examples, these options are shown for a sub-group and/or up to all of the services. In other examples, these options are not shown for the value-added services. Module 212 can include computer-executable instructions to configure processing unit(s) 202 to render the user interface 600 via a display (via I/O interface(s) 224).

Figure 7:
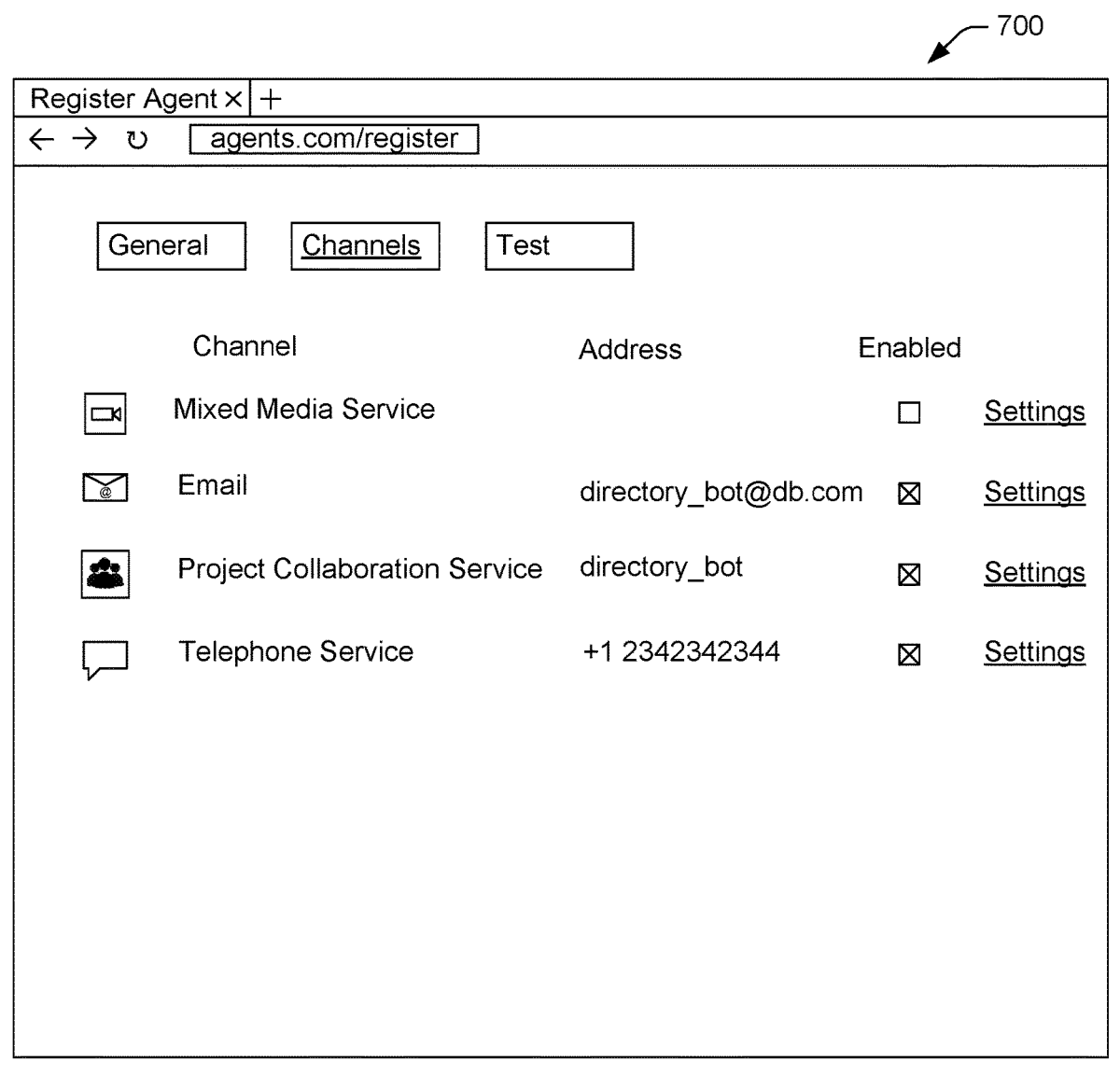

FIG. 7 illustrates an example user interface 700 for managing channels linked to an agent. In some examples, the channel, address, enablement state, and/or settings can be stored in the agent directory or can be otherwise available to the intercom 104. Module 212 can include computer-executable instructions to configure processing unit(s) 202 to render the user interface 700 via a display (via I/O interface(s) 224).

Figure 8:
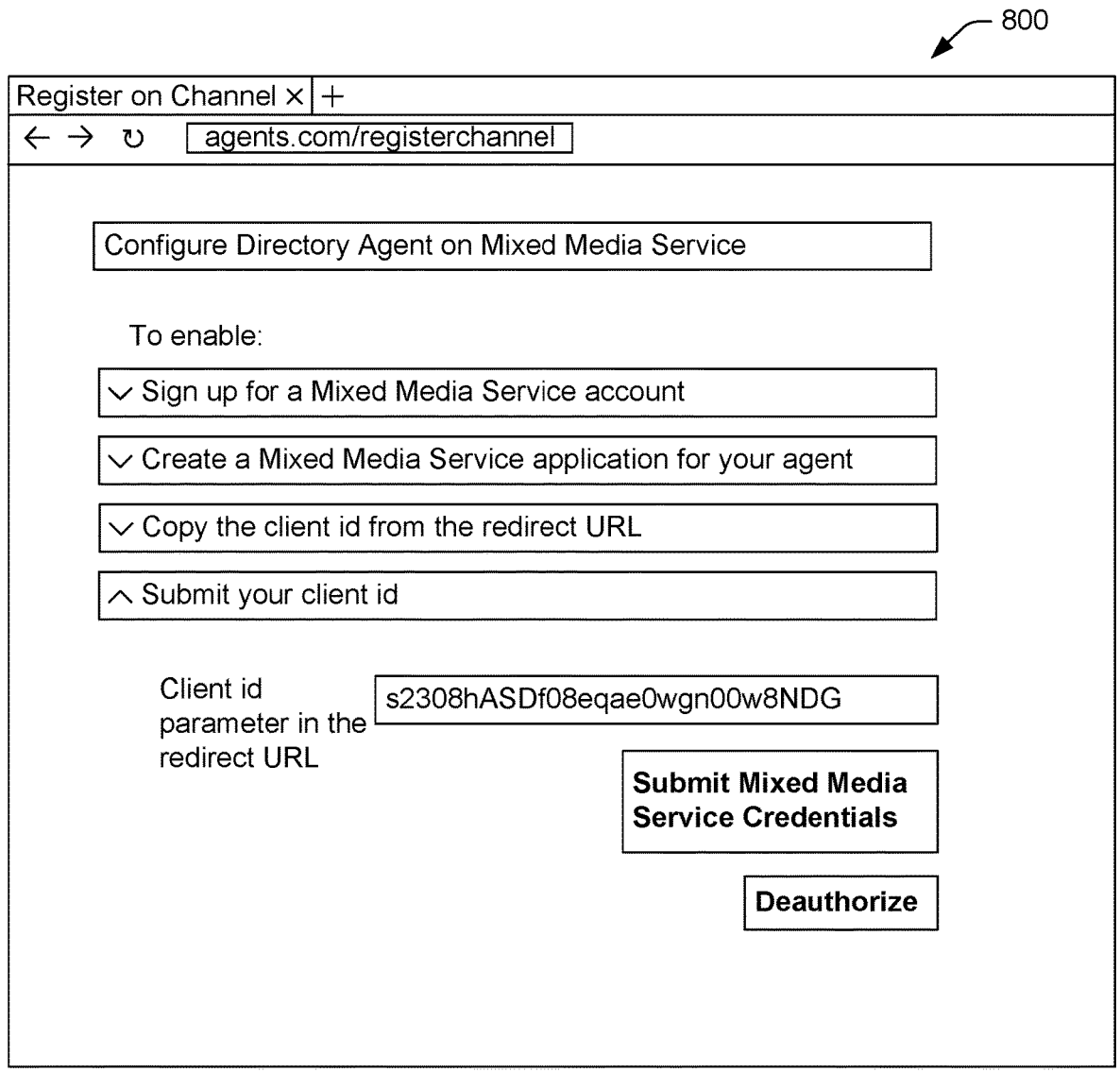
FIG. 8 is an example user interface for linking an agent to a channel.

FIG. 8 illustrates an example user interface 800 for linking an agent to a channel. In the example, the channel is a "mixed media service." The example also includes a guide for authenticating the agent on a channel so that the intercom 104 can make requests on behalf of an agent, such as requests to send and/or receive messages and/or files over the channel. In this example, the guide can include instructions to create a channel account, register the agent application, acquire a client id and client token assigned by the channel (e.g., revealed in the client id parameter in a redirect URL provided in response to the registration), and provide the client id and client token to the intercom 104 (i.e., to authorize the intercom 104 to act on behalf of the agent). Module 212 can include computer-executable instructions to configure processing unit(s) 202 to render the user interface 800 via a display (via I/O interface(s) 224).

Example Processes

Figure 9:
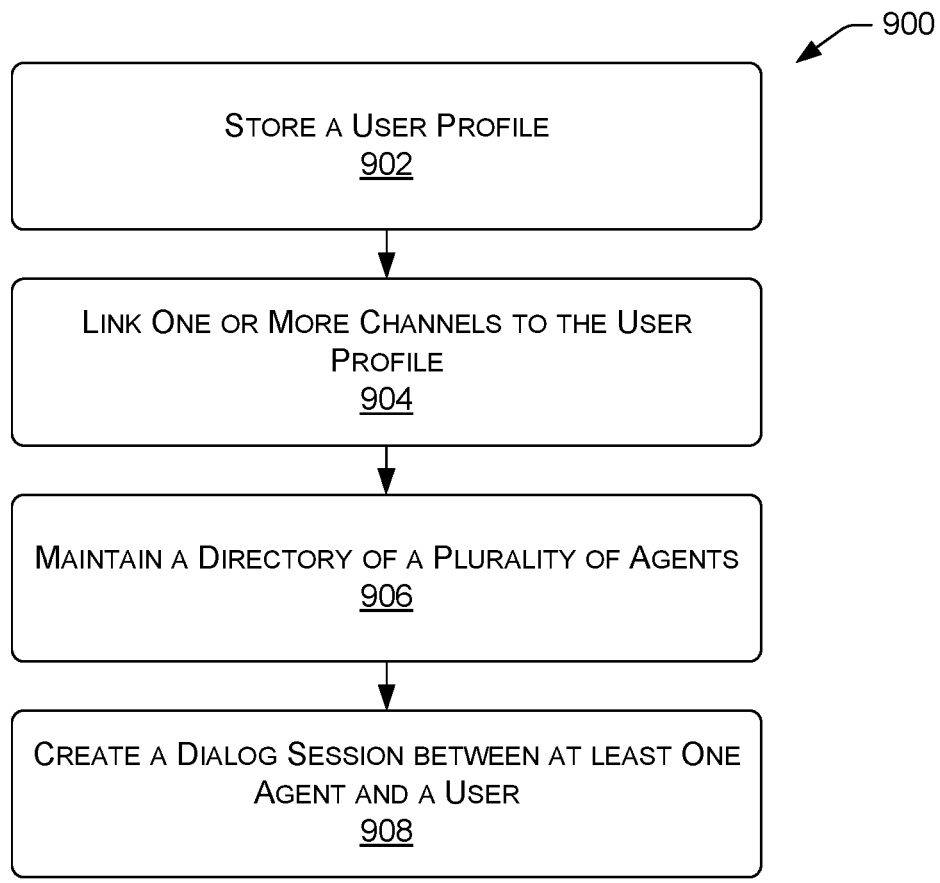
FIG. 9 is a flow diagram illustrating an example process to create a dialog session between at least one agent and a user.
Figure 10:
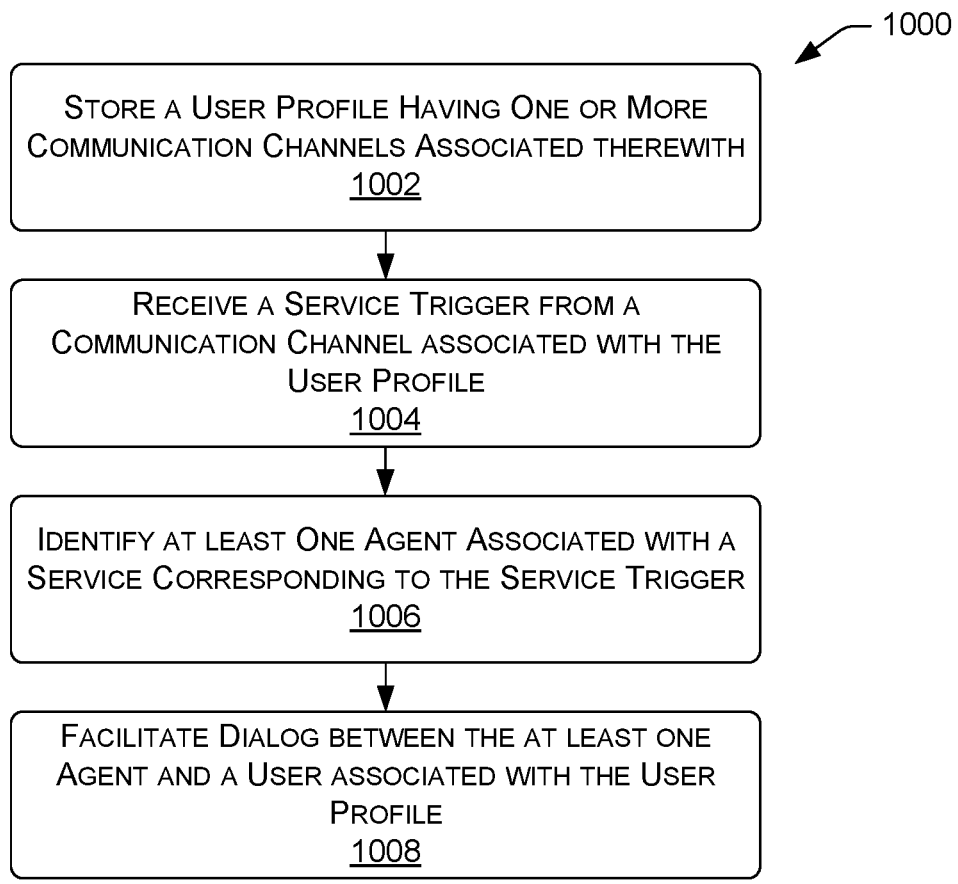
FIG. 10 is a flow diagram illustrating an example process to facilitate dialog between at least one agent and a user associated with a user profile.
Figure 11:
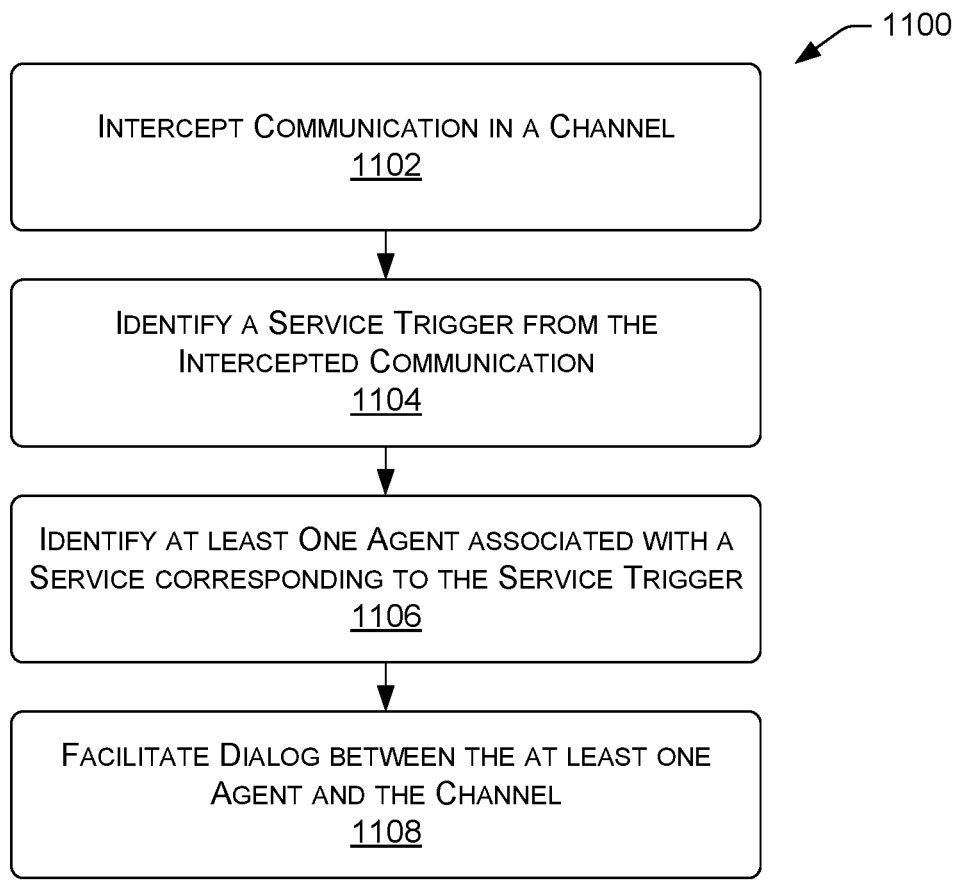
FIG. 11 is a flow diagram illustrating an example process to facilitate dialog between at least one agent and a channel.

FIGS. 9-11 illustrate example processes 900, 1000, and 1120, which can be performed in whole or in part. These processes can, but need not be, performed in the environment 100 of FIG. 1 and/or using the device 200 of FIG. 2.

FIG. 9 depicts an illustrative process 900 of implementing multi-channel agent intercommunication. At 902, the intercom 104 can store a user profile in any manner described herein. At 904, the intercom 104 can link one or more channels to the user profile in any manner described herein. In some examples, the illustrative process 900 can, at 904, alternatively or additionally link one or more channels to an agent.

At 906, the intercom 104 can maintain a directory of a plurality of agents in any manner described herein. In some examples, the plurality of agents are associated with providing user services responsive to dialog with the user and the plurality of agents being linked to one or more channels. In some examples, the services can include providing information responsive to a service trigger contained in dialog with the user, acting on behalf of the user, initiating actions outside the system, etc. At 908, the intercom 104 can create a dialog session between at least one agent 112(1) of the plurality of agents and a user. In some examples, the dialog session is configured to receive and send messages at an API endpoint of the at least one endpoint, the messages received from and sent to the API endpoint (i.e., from the agent) can be relayed to a user device via a channel (e.g., via a channel's API). In some examples, the messages can be relayed based at least in part on an association of the at least one agent 112(1) with a user profile associated with the channel, the user, and/or the user device.

FIG. 10 depicts an illustrative process 1000 of implementing multi-channel agent intercommunication. At 1002, the intercom 104 can store a user profile having one or more communication channels associated therewith in any manner described herein. At 1004, the intercom 104 can receive a service trigger from a communication channel associated with the user profile. In some examples, the service trigger is patent (e.g., no disambiguation or further processing is required to identify the service trigger—the service trigger is self-identifying). In some examples, the service trigger is latent (e.g., the service trigger is contained within communication received from the channel but the communication must first be processed in any manner described herein to identify the service trigger) and the illustrative process 1000 can further include processing the received service trigger to identify at least one agent 112(1) associated with a service corresponding to the service trigger.

At 1006, the intercom 104 can identify at least one agent 112(1) associated with a service corresponding to the service trigger in any manner described herein. In some examples, agents of a plurality of agents can have service identifiers associated with the plurality of agents to expose to the intercom 104 their functionality and to facilitate accurately identifying agents that provide services that correspond to service triggers. In some examples, service triggers can comprise single or multiple terms. In some examples, the intercom 104 can perform an optimization of the service trigger terms and the service identifiers to identify at least one agent 112(1) associated with a service corresponding to the service trigger.

At 1008, the intercom 104 can facilitate dialog between the at least one agent 112(1) and a user associated with the user profile in any manner described herein.

FIG. 11 depicts an illustrative process 1000 of implementing multi-channel agent intercommunication. At 1102, the intercom 104 can intercept communication in a channel in any manner described herein. In some examples, "in a channel" can include communication input into a channel and output by a channel API to the intercom 104. In some examples, "in a channel" can include intercepting communication internal to a channel service. In some examples, the intercom 104 can store the intercepted communication in a communication log in any manner described herein.

At 1104, the intercom 104 can identify a service trigger from the intercepted communication in any manner described herein. At 1106, the intercom 104 can identify at least one agent 112(1) associated with a service corresponding to the service trigger in any manner described herein. At 1108, the intercom 104 can facilitate dialog between the at least one agent 112(1) and the channel in any manner described herein.

Example Clauses

A. A system comprising: one or more processors; a network interface; and computer-readable media having stored thereon computer-executable instructions, that, when executed, program the one or more processors to perform operations comprising: storing a user profile of a user, the user profile being associated with one or more channels by which the user is able to communicate; maintaining a directory of a plurality of agents including the agent and including references to services provided by the plurality of agents, the plurality of agents including at least one non-human agent; linking, to the at least one non-human agent, multiple channels by which the non-human agent is able to communicate; receiving communication including a service trigger via the network interface from a channel associated with the user profile, the service trigger including a reference to at least one of the non-human agent or a service provided by the non-human agent; and based at least in part on the service trigger, creating a dialog session, between the at least one non-human agent and the user via the network interface, using a channel that is associated with the user profile and is linked to the at least one non-human agent.

B. The system as paragraph A recites, wherein the directory further comprises references to application programming interface (API) endpoints associated with the plurality of agents and wherein creating the dialog session includes: receiving messages from the user over the channel; relaying the messages to the at least one non-human agent via an API endpoint associated with the at least one non-human agent; receiving responses from the at least one non-human agent via the API endpoint; relaying the responses to the user over the channel on behalf of the at least one non-human agent.

C. The system as paragraph A or B recites, wherein the channel is a first channel and the operations further comprise: capturing dialog between the at least one non-human agent and the user via the dialog session; detecting a change of activity on the first channel; detecting a change of activity on a second channel of the multiple channels, the second channel also being associated with the user profile; and maintaining the dialog session between the at least one non-human agent and the user using the second channel, wherein maintaining the dialog session includes continuing the dialog between the non-human agent and the user and routing messages via an API endpoint associated with the at least one non-human agent over the second channel, the second channel being linked to the at least one non-human agent.

D. The system as any of paragraphs A-C recites, wherein the detecting the change of activity includes: monitoring or receiving one or more of an active status of a channel; a user indication; a preferred channel; a channel from which a majority of communication is being received; a channel from which most-recent communication has been received; or a channel preferred to be the channel-in-use based at least in part on one or more of: a time, a location of the user, an IP address associated with communication received from the channel, a calendar event, or a status of a device.

E. The system as any of paragraphs A-D recites, the operations further comprising formatting communication between the at least one non-human agent and the user to conform to standards of the channel.

F. The system as any of paragraphs A-E recites, wherein the at least one non-human agent is stored at a location remote from the system and communicates with the system via the network interface.

G. The system as any of paragraphs A-F recites, the operations further comprising: capturing communication in a channel associated with the user profile; identifying the service trigger from the captured communication; and selecting the at least one non-human agent based at least in part on a reference to services provided by the at least one non-human agent that correspond to keywords associated with the service trigger.

I. The system as any of paragraphs A-H recites, wherein the service trigger comprises a first service trigger, and the operations further comprise: identifying from the dialog session a second service trigger associated with a service provided by at least a second agent of the plurality of agents; and adding the second agent to the dialog session, the adding including: relaying, to the second agent via an API endpoint associated with the second agent, messages sent to and from the at least one non-human agent and the user, respectively; and relaying messages from the second agent via the API endpoint associated with the at least second agent to the at least one non-human agent and the user over the channel.

J. The system as any of paragraphs A-I recites, wherein the at least one non-human agent is a first agent and the operations further comprise: receiving an indication from the first agent that a request received via the dialog session from the channel is outside a scope of services provided by the first agent; identifying at least a second agent that provides services associated with the request; and adding the second agent to the dialog session, the adding including: relaying to the second agent via an API endpoint associated with the second agent messages sent to and from the first agent and the user, respectively; and relaying messages from the second agent via the API endpoint associated with the at least second agent to first agent and the user over the channel.

K. The system as any of paragraphs A-J recites, wherein creating the dialog session includes at least one of: receiving a message addressed to the at least one non-human agent from the user over the channel, the message including contact information of the at least one non-human agent corresponding to the channel; receiving a request from the user to add the at least one non-human agent to a dialog on the channel; or receiving a request to link the at least one non-human agent to the channel.

L. The system as any of paragraphs A-K recites, the operations further comprising: maintaining a directory of channels; adding information corresponding to a channel to the directory of channels, the information for linking agents or user profiles to the channel; receiving and storing information pertaining to agents in the directory of agents; receiving one or more of a client id or a client token for web services associated with an agent, at least one of the client id or client token allowing the system to: relay messages on behalf of the agent; and call services provided by the agent; and receiving one or more of a client id or a client token associated with authentication of an agent on a channel, at least one of the client id or client token allowing the system to relay messages on behalf of the agent over the channel.

M. A computer-readable medium having stored thereon instructions that, when executed, program one or more processors to perform operations comprising: registering an agent, the agent including disparate instructions that, when executed, program one or more processors to perform operations comprising providing services responsive to natural language dialog and the registering including receiving an application programming interface (API) endpoint associated with the agent and authentication credentials corresponding to multiple channels on which the agent has been authenticated to interact with channel services; receiving requests to dialog with the agent from a plurality of channels; and relaying dialog between the agent and the plurality of channels using the API endpoint and the authentication credentials of the agent.

N. The computer-readable medium as paragraph M recites, wherein relaying dialog between the agent and a channel of the plurality of channels includes: receiving messages from the channel on behalf of the agent using a sub-group of the authentication credentials; relaying the messages to the agent via the API endpoint; receiving responses from the agent via the API endpoint; and relaying the responses to the channel on behalf of the agent using the authentication credentials.

O. The computer-readable medium as paragraph M or N recites wherein using the authentication credentials includes authenticating a central service to act on behalf of the agent, the central service: registering the agent, receiving requests to dialog with the agent, receiving the messages, relaying the messages, receiving the responses, and relaying the responses.

P. The computer-readable medium as any of paragraphs M-O recites, the operations further comprising: storing a user profile having one or more channels associated therewith; and tracking a dialog session between the agent and a channel associated with the user profile, the tracking including associating a dialog identifier with the agent, the channel, and the user profile.

Q. The computer-readable medium as any of paragraphs M-P recites, the operations further comprising: receiving a message from a different channel associated with the user profile; and continuing the dialog between the agent and the user by using the different communication channel, the continuing including additionally associating the different channel with the dialog identifier or alternatively associating the different channel with the dialog identifier in place of the channel.

R. A method comprising: intercepting communication in a channel; identifying a service trigger from the intercepted communication; identifying at least one agent associated with a service corresponding to the service trigger; and relaying dialog between the at least one agent and a channel endpoint associated with the channel.

S. The method as paragraph R recites, wherein the service trigger includes one or more of: keywords that are associated with the service, subject matter corresponding to the service, a received user location corresponding to the service, a time corresponding to the service, a data type corresponding to the service, a request to add an agent to a conversation, a reference to an agent, or a request for a service.

T. The method as paragraph R or S recites further comprising: identifying a change from a first channel to a second channel; and based at least in part on the change in channel, relaying the dialog between the at least one agent and an endpoint associated with the second channel.

U. The method any of paragraphs R-T recites further comprising: detecting one or more of a fidelity of the channel or constraints of the channel; and conforming responses of the at least one agent to one or more of the fidelity of the channel or the constraints of the channel.

V. A computer-readable media having thereon computer-executable instructions to, upon execution, configure a computer to perform a method as any of paragraphs R-U recites.

W. A system comprising: means for processing, means for storing, and means for performing any steps of a method as any of paragraphs R-U recites.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system comprising: one or more processors; a network interface; and computer-readable media having stored thereon computer-executable instructions, that, when executed, cause the one or more processors to perform operations comprising: maintaining a plurality of communication channels for electronic communication via the network interface; accessing a user profile of a user, the user profile being associated with one or more user-communication channels by which a user device of the user is able to communicate; maintaining a directory of a plurality of agents, each agent being a computer program that, when executed, implements a dialog-based service to provide information in a user interface via an exchange of natural language, the plurality of communication channels being shared by the plurality of agents, each agent being linkable to one or more of the communication channels; linking one or more first-agent communication channels to a first agent from the plurality of agents, wherein linking the one or more first-agent communication channels to the first agent comprises causing an intercom to use data stored in an agent directory to make requests to send or receive messages or files over the one or more first-agent communication channels on behalf of the first agent; receiving a natural language communication from the user of the user device via the network interface through one of the user-communication channels, the natural language communication causing a service trigger to activate the first agent for communication with the user device in response to identifying relevant services specified in the natural language communication; based at least in part on the service trigger, creating a dialog session between the first agent and the user device via the network interface using one or more of the user-communication channels and the first-agent communication channels; capturing dialog between the first agent and the user device via the dialog session; detecting a change of activity on a first communication channel; detecting a change of activity on a second communication channel of the user-communication channels; and maintaining the dialog session between the first agent and the user using the second communication channel, wherein maintaining the dialog session includes continuing the dialog between the first agent and the user and routing messages via an API endpoint associated with the first agent over the second communication channel, the second communication channel being one of the first-agent communication channels.

2. The system of claim 1, wherein the directory of a plurality of agents further comprises references to application programming interface (API) endpoints associated with the plurality of agents, wherein creating the dialog session includes: receiving messages from the user over one of the user-communication channels; relaying the messages to the first agent via an API endpoint associated with the first agent; receiving responses from the first agent via the API endpoint; and relaying the responses to the user device over one of the user-communication channels on behalf of the first agent.

3. The system of claim 1, wherein the detecting the change of activity includes: monitoring or receiving one or more of an active status of the second communication channel; a user indication; a preferred communication channel; a communication channel from which a majority of communication is being received; a communication channel from which most-recent communication has been received; or a communication channel preferred to be a channel-in-use based at least in part on one or more of: a time, a location of the user, an IP address associated with communication received from the communication channel, a calendar event, or a status of a device.

4. The system of claim 1, the operations further comprising formatting communication between the first agent and the user device to conform to standards of the communication channel.

5. The system of claim 1, wherein the first agent is executed at a location remote from the system and communicates with the system via the network interface.

6. The system of claim 1, wherein creating a dialog further comprises: selecting the first agent based at least in part on a reference to services provided by the first agent that correspond to keywords associated with the service trigger.

7. The system of claim 1, wherein the service trigger comprises a first service trigger, and the operations further comprise: identifying from the dialog session a second service trigger associated with a service provided by a second agent of the plurality of agents; and adding the second agent to the dialog session, the adding including: relaying, to the second agent via an API endpoint associated with the second agent, messages sent to and from the first agent and the user device, respectively; and relaying messages from the second agent via the API endpoint associated with the second agent to the first agent and the user device over the communication channel.

8. The system of claim 1, the operations further comprising: receiving an indication from the first agent that a request received via the dialog session from the communication channel is outside a scope of services provided by the first agent; identifying a second agent that provides services associated with the request; and adding the second agent to the dialog session, the adding including: relaying to the second agent, via an API endpoint associated with the second agent, messages sent to and from the first agent and the user device, respectively; and relaying messages from the second agent via the API endpoint associated with the at least second agent to first agent and the user device over the communication channel.

9. The system of claim 2, wherein creating the dialog session includes at least one of: receiving a message addressed to the first agent from the user device over the communication channel, the message including contact information of the first agent corresponding to the communication channel; receiving a request from the user device to add the first agent to a dialog on the communication channel; or receiving a request to link the first agent to the communication channel.

10. The system of claim 1, the operations further comprising: adding information corresponding to a communication channel to a directory of communication channels, the information for linking agents or user profiles to the communication channel; receiving and storing information pertaining to agents in the directory of the plurality of agents; receiving one or more of a client id or a client token for web services associated with an agent, at least one of the client id or client token allowing the system to: relay messages on behalf of the agent; and call services provided by the agent; and receiving one or more of a client id or a client token associated with authentication of an agent on a communication channel, at least one of the client id or client token allowing the system to relay messages on behalf of the agent over the communication channel.

11. A non-transitory computer-readable medium having stored thereon instructions that, when executed, program one or more processors to perform operations comprising: registering an agent, the agent including instructions that, when executed, program one or more processors to perform operations comprising: linking one or more agent communication channels to the agent, wherein linking the one or more agent communication channels to the agent comprises causing an intercom to use data stored in an agent directory to make requests to send or receive messages or files over the one or more agent communication channels on behalf of the agent; providing dialog-based services to provide information in a user interface via an exchange of natural language, the registering the agent including receiving an application programming interface (API) endpoint associated with the agent and authentication credentials corresponding to multiple communication channels on which the agent has been authenticated for communication to one or more user devices; receiving requests to dialog with the agent from the multiple communication channels, each request comprising a service trigger, the service trigger being in response to identifying relevant services specified in a natural language communication received from a user of the user device; based at least in part on the service trigger, creating a dialog session between the agent and the multiple communication channels using the one or more agent communication channels; capturing dialog between the agent and the user device via the dialog session; detecting a change of activity on a first communication channel; detecting a change of activity on a second communication channel; and maintaining the dialog session between the agent and the multiple communication channels using the API endpoint and the authentication credentials of the agent for communicating with the one or more user devices via the second communication channel, the second communication channel being one of the one or more agent communication channels.

12. The non-transitory computer-readable medium of claim 11, wherein relaying dialog between the agent and one of the multiple communication channels includes: receiving messages from one of the multiple communication channels on behalf of the agent using a sub-group of the authentication credentials; relaying the messages to the agent via the API endpoint; receiving responses from the agent via the API endpoint; and relaying the responses to one of the multiple communication channels on behalf of the agent using the authentication credentials.

13. The non-transitory computer-readable medium of claim 12 wherein using the authentication credentials includes authenticating a central service to act on behalf of the agent, the central service configured for: registering the agent, receiving requests to dialog with the agent, receiving the messages, relaying the messages, receiving the responses, and relaying the responses.

14. The non-transitory computer-readable medium of claim 13, the operations further comprising: storing a user profile having one or more user-communication channels associated therewith; and tracking a dialog session between the agent and a user-communication channel associated with the user profile, the tracking including associating a dialog identifier with the agent, the user-communication channel, and the user profile.

15. The non-transitory computer-readable medium of claim 14, the operations further comprising: receiving a message from a different communication channel associated with the user profile; and continuing the dialog between the agent and a user device by using the different communication channel, the continuing including additionally associating the different communication channel with the dialog identifier or alternatively associating the different communication channel with the dialog identifier.

16. A method comprising: intercepting communication in a communication channel from a plurality of communication channels; identifying a service trigger from the intercepted communication, the service trigger being in response to identifying relevant services specified in a natural language communication received from a user of the user device; identifying a first agent from the plurality of agents associated with a service corresponding to the service trigger, each agent being a computer program that, when executed, implements a dialog-based service to provide information in a user interface via an exchange of natural language, the plurality of communication channels being shared by the plurality of agents, each agent being linkable to one or more of the communication channels; linking one or more first-agent communication channels from the plurality of communication channels to the first agent, wherein linking the one or more first-agent communication channels to the first agent comprises causing an intercom to use data stored in an agent directory to make requests to send or receive messages or files over the one or more first-agent communication channels on behalf of the first agent; relaying dialog between the first agent and a first communication channel endpoint associated with a user device for presenting the user interface; identifying a change from the first communication channel endpoint to an endpoint associated with a second communication channel; based at least in part on the change in the communication channel, maintaining a dialog session between the first agent and the user device using the endpoint associated with the second communication channel, wherein maintaining the dialog session includes continuing the dialog between the first agent and the user device and routing messages via an API endpoint associated with the first agent over the second communication channel, the second communication channel being one of the first-agent communication channels.

17. The method of claim 16, wherein the service trigger includes one or more of: keywords that are associated with the service, subject matter corresponding to the service, a received user location corresponding to the service, a time corresponding to the service, a data type corresponding to the service, a request to add an agent to a conversation, a reference to an agent, or a request for a service.

18. The method of claim 16 further comprising: detecting one or more of a fidelity of the communication channel or constraints of the communication channel; and conforming responses of the first agent to one or more of the fidelity of the communication channel or the constraints of the communication channel.

* * * * *